United States Patent
Yamashita et al.

(10) Patent No.: US 6,678,224 B2
(45) Date of Patent: Jan. 13, 2004

(54) TRACKING ERROR BALANCE ADJUSTMENT CIRCUIT AND A CURRENT CONTROL CIRCUIT USED FOR AN OPTICAL DISK PLAYBACK APPARATUS, AND AN OPTICAL DISK PLAYBACK APPARATUS INCLUDING THE SAME

(75) Inventors: Ryuichi Yamashita, Kamakura (JP); Hiroyuki Haga, Kamakura (JP); Shinobu Murai, Yokohama (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 10/302,992

(22) Filed: Nov. 25, 2002

(65) Prior Publication Data

US 2003/0072227 A1 Apr. 17, 2003

Related U.S. Application Data

(62) Division of application No. 09/523,284, filed on Mar. 10, 2000, now Pat. No. 6,504,799.

(30) Foreign Application Priority Data

Mar. 12, 1999 (JP) ........................................... 11-066292
Sep. 22, 1999 (JP) ........................................... 11-268353

(51) Int. Cl.[7] ................................................ G11B 7/00
(52) U.S. Cl. ................................ 369/47.25; 369/59.15; 369/124.1
(58) Field of Search ............................ 369/44.29, 44.34, 369/44.35, 47.25, 59.15, 124.1

(56) References Cited

U.S. PATENT DOCUMENTS

| | | | | |
|---|---|---|---|---|
| 5,001,441 A | * | 3/1991 | Gen-kuong | 330/294 |
| 5,287,340 A | * | 2/1994 | Chapman et al. | 389/44.41 |
| 6,040,674 A | * | 3/2000 | Nishida et al. | 369/44.25 |

FOREIGN PATENT DOCUMENTS

JP 6-120756 4/1994

* cited by examiner

*Primary Examiner*—Nabil Hindi
(74) *Attorney, Agent, or Firm*—Oblon, Spivak, McClelland, Maier & Neustadt, P.C.

(57) ABSTRACT

A tracking error balance adjustment circuit, and a current control circuit used for a variable gain RF amplifier automatically controlled to output a signal having a predetermined amplitude. The tracking error balance adjustment circuit comprises two separate gain adjusting circuits, each having variable attenuation circuit having first gm amplifier of variable gm type, a second gm amplifier of variable gm type connected to the variable attenuation circuit, and an output circuit connected to the second gm amplifier, comprising an operational amplifier circuit having feedback resistor, wherein the first and second gm amplifiers are differentially controlled commonly by a control current. The a current control circuit is arranged in a variable gain RF amplifier connected to a head amplifier circuit amplifying an output signal from optical pickup, controlling a current output of the variable gain RF amplifier so that it changes in accordance with different functions in the range where the control voltage input is lower than the reference potential and the range where the control voltage input is higher than the reference potential, with the result that the gain control sensitivity can be set almost equal between the two ranges.

3 Claims, 13 Drawing Sheets

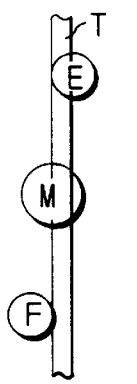 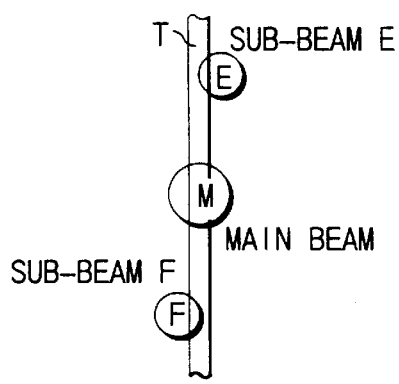 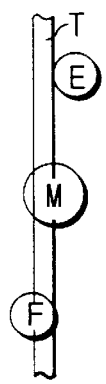 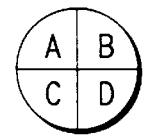
FIG. 1A  FIG. 1B  FIG. 1C  FIG. 1D
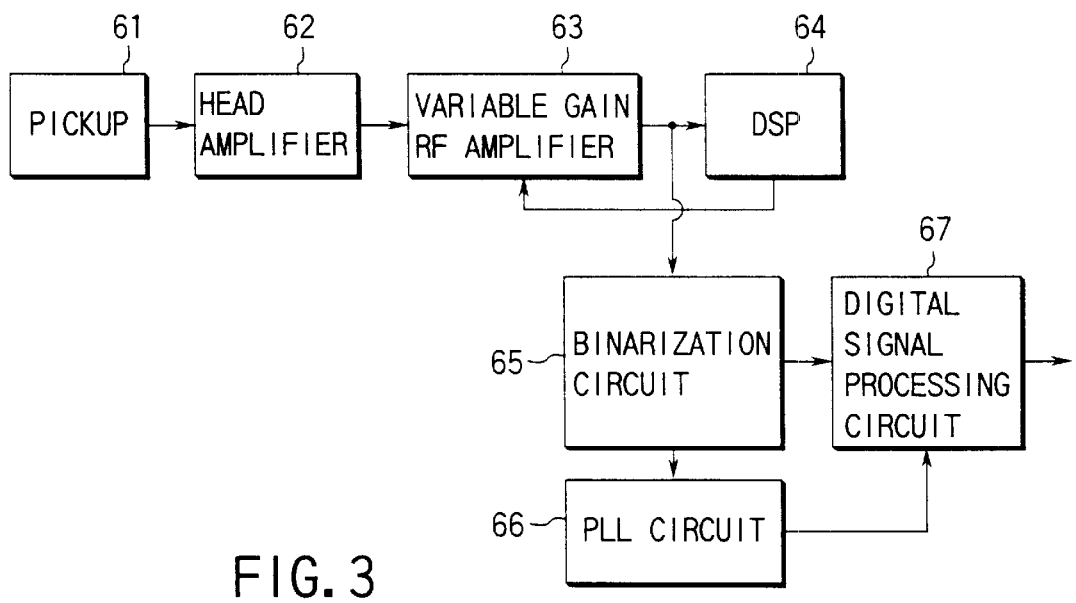
FIG. 3

TRACKING ERROR BALANCE ADJUSTMENT CIRCUIT AND A CURRENT CONTROL CIRCUIT USED FOR AN OPTICAL DISK PLAYBACK APPARATUS, AND AN OPTICAL DISK PLAYBACK APPARATUS INCLUDING THE SAME

CROSS-REFERENCE TO RELATED APPLICATIONS

The present application claims priority under 35 USC §119 to Japanese Patent Application Nos. 11-066292, filed Mar. 12, 1999 and No. 11-268353, filed Sep. 22, 1999; and under 35 U.S.C. §120 to co-pending U.S. patent application Ser. No. 09/523,284 filed Mar. 10, 2000, the entire contents of which are incorporated herein by reference.

This application is a Division of application Ser. No. 09/523,284 U.S. Pat. No. 6,504,799 filed on Mar. 10, 2000.

BACKGROUND OF THE INVENTION

The present invention relates to a tracking error signal generation circuit for an optical disk playback apparatus for playing back an optical disk and, more particularly, to a tracking error balance adjustment circuit. The present invention is applied to an audio compact disk (CD) player, the CD-ROM playback apparatus of a computer system, and the like.

The present invention also relates to a current control circuit, variable gain amplifier circuit using the same, and optical disk playback apparatus and, more particularly, to a current control circuit for supplying a control current to a gm amplifier whose transconductance gm is changed by controlling the collector current of a differential amplifier transistor. The present invention is applied to an audio compact disk (CD) player, the CD-ROM drive of a computer system, and the like.

Generally, in tracking control in a CD-ROM playback apparatus, the positional shift between a track on a rotating disk and the irradiation position of a laser beam emitted by an optical pickup is detected to control the position of the optical pickup so as to accurately irradiate the track with the laser beam.

FIGS. 1A to 1C show different examples of the irradiation positions of laser beams (main beam M and two sub-beams E and F) on a track T of a disk.

The irradiation positions of the two sub-beams E and F are set to slightly shift from each other in opposite directions along the track width on the two sides of the irradiation position of the main beam M along the track.

As shown in FIG. 1D, the main beam M is photoelectrically converted by four photodiodes A, B, C, and D in correspondence with four divided regions of the main beam M. Outputs from the four photodiodes are input to a head amplifier where the outputs are added.

Each of the two sub-beams E and F is photoelectrically converted by one photodiode. An output (E or F signal) from the photodiode is input to the tracking error signal generation circuit of the head amplifier.

This tracking error signal generation circuit removes the high-frequency components of the E and F signals, differentially adds the resultant E and F signals, and outputs the sum as a tracking error signal. Tracking servo control reduces the tracking error signal to 0.

FIG. 2 shows a conventional tracking error signal generation circuit.

A first current-to-voltage conversion circuit 71 receives an output (RF signal) from a first photodiode arranged in correspondence with one (first sub-beam E) of the two sub-beams, converts a current to a voltage, and removes a high-frequency component.

A second current-to-voltage conversion circuit 72 receives an output (RF signal) from a second photodiode arranged in correspondence with the other one (second sub-beam F) of the two sub-beams, converts a current to a voltage, and removes a high-frequency component.

Output voltages from the two current-to-voltage conversion circuits 71 and 72 are adjusted by a tracking error balance adjustment circuit 80, and differentially input to an adder circuit 73 via resistive elements R2. An output from the adder circuit 73 is input to a gain adjustment circuit 74 via a resistive element R3.

In the adder circuit 73, a feedback resistive element Rf and a capacitive element Cf for passing a high-frequency component are parallel-connected between the (−) input terminal and output terminal of an operational amplifier circuit OA3. A resistive element Ro and a capacitive element Co for removing a high-frequency component are parallel-connected between a reference potential and the (+) input terminal of the operational amplifier circuit OA3.

In the gain adjustment circuit 74, a feedback resistor Ru adjustable by the user is connected (e.g., externally connected to an LSI) between the (−) input terminal and output terminal of an operational amplifier circuit OA4. A resistive element R4 is connected between the reference potential and the (+) input terminal of the operational amplifier circuit OA4.

If a tracking error signal TE output from the gain adjustment circuit 74 is 0, the two sub-beams E and F are at ideal irradiation positions; and if the tracking error signal TE shifts in a (+) or (−) direction, the two sub-beams E and F shift from ideal irradiation positions to one side along the track width.

The role of the tracking error balance adjustment circuit 80 will be explained.

Even if the irradiation position of a laser beam on the track of a disk is accurate as in a case wherein tracking control is accurately done, characteristics may vary between the first system including the first sub-beam E and corresponding first photodiode and the second system including the second sub-beam F and corresponding second photodiode. In this case, an output (E signal) from the first photodiode and an output (F signal) from the second photodiode exhibit different amplitudes. To correct such variations, tracking error balance adjustment must be performed. Thus, output voltages OE and OF from the two current-to-voltage conversion circuits 71 and 72 are adjusted by the tracking error balance adjustment circuit 80, and then differentially added by the adder circuit 73. As a control signal input to the adjustment circuit 80, a DC tracking error balance adjustment voltage TEB generated by another means is input.

The tracking error balance adjustment circuit 80 comprises two current-controlled variable gain control circuits in correspondence with the voltage OE prepared by converting the E signal by the first current-to-voltage conversion circuit 71, and the voltage OF prepared by converting the F signal by the second current-to-voltage conversion circuit 72.

The gains of the two variable gain control circuits are controlled by an output current (control current) prepared by converting an input tracking error balance adjustment voltage TEB into a current by a current control circuit 90. In general, the two circuits are differentially controlled to increase the gain of one circuit and decrease the gain of the other circuit.

The conventional tracking error balance adjustment circuit 80 shown in FIG. 2 will be explained.

The input voltages OE and OF of these circuits are respectively input to current-controlled variable gain control circuits 82 via attenuation circuits 81. The output side of each variable gain control circuit 82 is connected to an operational amplifier circuit 83 having an RNF (feedback resistive element) connected between the input and output terminals. These circuits 81 to 83 are formed from bipolar transistors.

The attenuation circuit 81 is made up of an input resistor R1 connected between a signal input node and an attenuation output node, and a first gm amplifier A1 of constant gm type having an equivalent resistor between the attenuation output node and an AC ground node.

The current-controlled variable gain control circuit 82 uses a second gm amplifier A2 of variable gm type in which gm changes in accordance with a control current from the current control circuit 90. By connecting the first gm amplifier A1 to the second gm amplifier A2, as described above, gm variations including the temperature coefficient of the second gm amplifier A2 are cancelled.

To perform tracking error balance adjustment using the tracking error balance adjustment circuit 80 shown in FIG. 2, the tracking error balance adjustment voltage TEB is changed to change an output current (control current) from the current control circuit 90. In accordance with this control current, the operating current of the second gm amplifier A2 is changed (e.g., 50 to 150 $\mu$A). At this time, the two circuits are differentially controlled to increase gm of the second gm amplifier A2 in one circuit and decrease gm of the second gm amplifier A2 in the other circuit. Accordingly, the tracking error signal is controlled to 0.

In this case, the control current to one circuit is increased. Then, the operating current of the second gm amplifier A2 increases in proportion to the control current to increase gm and the gain. To the contrary, the control current to the other circuit is decreased. Then, the operating current of the second gm amplifier A2 decreases in proportion to the control current to decrease gm and the gain.

The conventional tracking error balance adjustment circuit 80 suffers the following problems.

The second gm amplifier A2 also functions to drive the output-side circuit RNF. When the control current is decreased to set a small gain, i.e., small gm of the second gm amplifier A2, RNF cannot be satisfactorily driven.

The output offset of the tracking error balance adjustment circuit 80 is desirably set small. For this purpose, gm of the second gm amplifier A2 must be minimized, and a necessary gain and RNF drivability must be ensured.

However, as described above, the control current for controlling gm of the second gm amplifier A2 controls the gain and RNF drivability, which greatly limits the circuit design.

As described above, the tracking error balance adjustment circuit of the conventional optical disk playback apparatus cannot satisfactorily drive the subsequent RNF when gm of the second gm amplifier is set small. If gm of the second gm amplifier A2 is minimized to reduce the output offset, it becomes difficult to ensure a necessary gain and RNF drivability. This greatly limits the circuit design.

The present invention has been made to overcome the conventional drawbacks, and has as its object to provide a tracking error balance adjustment circuit in which the same gain balance adjustment width as in the prior art can be ensured even with a smaller change in control current than in the prior art, gm of a subsequent gm amplifier need not be set so small as to fail to drive an output-stage RNF, and the output offset can be reduced, and an optical disk playback apparatus using the same.

Next, prior art regarding a current control circuit, a variable gain amplifier circuit using the current control circuit, an optical disk playback apparatus using the current control circuit will be explained.

In an optical disk playback apparatus for reading and playing back, with an optical pickup, information data recorded on an optically readable/writable optical disk such as a compact disk, the amplitude of a playback signal varies owing to physical variations (in the reflectance of a reflecting film, the modulation factor, or the like) caused by manufacturing variations in optical disks to be played back.

FIG. 3 schematically shows a conventional optical disk playback apparatus having a playback signal amplitude adjustment function in order to prevent amplitude variations.

In FIG. 3, an optical pickup 61 incorporates a semiconductor laser, photoelectric converter, and the like. The pickup 61 reads digital signals recorded on an optical disk rotated by a motor, and generates an RF (e.g., 1 to 40 MHz) analog signal.

The RF signal output from the pickup 61 is added and amplified by a head amplifier 62. An output signal from the head amplifier 62 is amplified by a variable gain RF amplifier 63 controlled by an AGC (Automatic Gain Control) loop, and at the same time automatically adjusted to have a predetermined amplitude suitable for subsequent signal processing.

An output signal from the variable gain RF amplifier 63 is input to a DSP (digital servo processor) 64. The DSP 64 forms an amplitude adjustment loop for comparing the amplitude of the output signal from the variable gain RF amplifier 63 with a predetermined signal amplitude reference value serving as an adjustment target set in advance, and controlling the gain of the variable gain RF amplifier 63 in accordance with the difference so as to keep the amplitude of the output signal constant.

The output signal from the variable gain RF amplifier 63 is also sent to a binarization circuit (data slice circuit) 65 where the output signal is converted into a binary signal of "H" or "L" with reference to a predetermined slice level. This binary signal is input to a PLL (Phase-Locked Loop) circuit 66 which generates a clock signal synchronized with the binary signal. A digital signal processing circuit 67 receives the clock signal and binary signal, performs demodulation/error correction, and plays back information data recorded on the optical disk.

Although not shown, this playback apparatus comprises a sliding actuator for sliding the pickup 61 radially along the optical disk, a disk motor for rotating the optical disk at a predetermined rotational speed, and a system controller microcomputer for controlling various servo control circuits.

The amplitude of an AC component (corresponding to information data) included in an output signal from the pickup 61 is influenced by both the modulation factor and the reflectance (depending on a scratch, dirt, and the like on the disk surface) of the reflecting film of an optical disk.

If the modulation factor and the reflectance of an optical disk to be played back are low, the amplitude of an AC component included in the output signal from the pickup 61 is small. In this case, the amplitude adjustment feedback control loop increases the gain of the variable gain RF amplifier 63 in order to control the amplitude of the AC component to a predetermined set value.

To perform accurate binarization in the binarization circuit 65, an output signal from the variable gain RF amplifier 63 must have a proper amplitude. In general, the binarization circuit 65 is designed to execute control of an optimal slice level when an output from the variable gain RF amplifier 63 has a predetermined amplitude.

FIG. 4 shows an arrangement of the variable gain RF amplifier 63 in FIG. 3.

In FIG. 4, the transconductance gm of a gm amplifier 71 is changed by controlling the collector current of an amplifier bipolar transistor.

A feedback resistor 73 is connected between the output terminal of a bipolar type operational amplifier circuit 72 and its inverting input terminal (−) for receiving an output signal from the gm amplifier 71. The non-inverting input terminal (+) of the operational amplifier circuit 72 is connected to a reference potential VRO.

A current control circuit 74 is constituted as follows. Of a differential pair of transistors Q71 and Q72, the base of one transistor Q71 is biased to a proper reference potential VREF, whereas the base of the other transistor Q72 receives a control voltage RFGC from the DSP 64 via a control voltage input terminal 75. The level of an output current is controlled in accordance with the level of the control voltage RFGC, and the output current controls the collector current of the differential amplifier transistor of the gm amplifier 71.

In the current control circuit 74, first and second constant current sources 171 and 172 are respectively connected between a VCC node for receiving a power supply potential VCC, and the emitters of the differential pair of PNP transistors Q71 and Q72. A gain adjustment resistor 76 is connected between these emitters.

The collector of the PNP transistor Q72 is connected to a ground potential GND, whereas the collector of the PNP transistor Q71 is connected to GND via the collector-emitter path of an NPN transistor Q73 having a collector and base connected to each other. The base and emitter of the NPN transistor Q73 are respectively connected (current-mirror-connected) to those of an NPN transistor Q74. The collector of the NPN transistor Q74 is connected to the gain control input node of the gm amplifier 71.

A third constant current source 173 for supplying a predetermined collector current to the NPN transistor Q73 is connected between the VCC node and the collector of the NPN transistor Q73.

The bases of the differential pair of PNP transistors Q71 and Q72 receive the reference potential VREF and control voltage RFGC, respectively. The collector current of the PNP transistor Q72 and that of the NPN transistor Q73 are controlled in accordance with the control voltage RFGC.

More specifically, if the control voltage RFGC exceeds the reference potential VREF, the current of one PNP transistor Q72 out of the differential pair of transistors Q71 and Q72 decreases, and the current of the other PNP transistor Q71 increases.

To the contrary, if the control voltage RFGC becomes lower than the reference potential VREF, the current of one PNP transistor Q72 out of the differential pair of transistors Q71 and Q72 increases, and the current of the other PNP transistor Q71 decreases. In this case, even if the control voltage RFGC drops excessively to turn off the PNP transistor Q71 out of the differential pair of transistors Q71 and Q72, the NPN transistor Q73 receives a predetermined collector current from the third constant current source 173.

The collector current of the NPN transistor Q74 current-mirror-connected to the NPN transistor Q73 controls the magnitude of the collector current of the gm amplifier 71.

FIGS. 5A and 5B respectively show an output current characteristic of the current control circuit 74 in FIG. 4 with respect to the control voltage RFGC and a gain (logarithm expression) characteristic of the gm amplifier 71 in FIG. 4 with respect to the control voltage RFGC.

In the characteristic shown in FIG. 5A, assuming that the output current is 150 $\mu$A (IREF) for the control voltage RFGC serving as the reference potential VREF (e.g., 1.65V), the output current is 50 $\mu$A (smaller than IREF by 100 $\mu$A) for the control voltage RFGC of 0V, and is 250 $\mu$A (larger than IREF by 100 $\mu$A) for the control voltage RFGC of 3.3V. That is, the current output linearly changes with respect to changes in control voltage RFGC of the current control circuit 74. The change slope is equal between a range where the control voltage RFGC is lower than the reference potential VREF and a range where the control voltage RFGC is higher than the reference potential VREF.

In the characteristic shown in FIG. 5B, assuming that the gain is 0 dB for the control voltage RFGC of 1.65V, the gain is about −10 dB in 20 log(50/150) for the control voltage RFGC of 0V, and is about +4.4 dB in 20 log(250/150) for the control voltage RFGC of 3.3V. That is, the gain of the gm amplifier 71 linearly changes both in the range where the control voltage RFGC of the current control circuit 74 is lower than the reference potential VREF and the range where the control voltage RFGC is higher than the reference potential VREF. However, as for the gain change slope (control sensitivity) of the gm amplifier 71, the control sensitivity is different between the two ranges.

In other words, when the control voltage RFGC increases and decreases equally by 1.65V from the reference potential VREF, the gain change width of the variable gain RF amplifier shown in FIG. 4 becomes different between the ranges higher and lower than the reference potential VREF. This makes it difficult to design the subsequent circuit, resulting in inconvenience.

An output current from the gm amplifier 71 in FIG. 4 functions to drive the feedback resistor 73 between the inverting input terminal (−) and output terminal of the operational amplifier circuit 72. If the gain of the gm amplifier 71 excessively decreases, the level for driving the feedback resistor 73 runs short.

As described above, the variable gain RF amplifier used in the conventional optical disk playback apparatus exhibits different gain control sensitivities of the gm amplifier between the range where the control voltage RFGC input to the current control circuit for controlling the gain of the gm amplifier is lower than the reference potential VREF, and the range where the control voltage RFGC is higher than the reference potential VREF. Even if the control voltage RFGC increases and decreases equally from the reference potential VREF, the gain change width is unbalanced. This makes it difficult to design the subsequent circuit, thereby resulting in inconvenience.

If the gain of the gm amplifier excessively decreases, the level for driving the feedback resistor connected between the input and output terminals of the subsequent operational amplifier circuit runs short.

The present invention has been made to overcome the conventional drawbacks, and has as its object to provide a current control circuit capable of arbitrarily setting the output current so that the sensitivity can be different between the range where the control voltage RFGC is lower than the reference potential VREF and the range where the control voltage RFGC is higher than the reference potential VREF.

It is another object of the present invention to provide a convenient variable gain amplifier circuit in which the a gain control sensitivity of a gm amplifier can be set substantially equal in both of the range where the control voltage RFGC input to the current control circuit is lower than the reference potential VREF and the range where the control voltage RFGC is higher than the reference potential VREF, thereby simplifying the design of the subsequent circuit, and an optical disk playback apparatus using the same.

BRIEF SUMMARY OF THE INVENTION

According to the first aspect of the invention, there is provided A tracking error balance adjustment circuit for correcting at least one of first and second signals in level to set a level difference between the first and second signals to substantially zero when an irradiation position of a laser beam substantially coincides with a track center wherein a tracking error signal is generated in accordance with the level difference between the first and second signals that complementarily change in level in accordance with a deviation of the irradiation position of the laser beam from the track center in order to detect a shift of the irradiation position of the laser beam emitted by an optical pickup from a track which holds information on an optical disk, the tracking error balance adjustment circuit comprising: a current control circuit receiving a tracking error balance adjustment voltage and converting the tracking error balance adjustment voltage into a control current; and a gain control circuit receiving the first signal, the second signal, and the control current, adjusting at least one of the first signal and the second signal in level, and outputting the first signal and the second signal, the gain control circuit comprising at least two signal paths each of which has a plurality of gm amplifiers of variable gm type, the plurality of gm amplifiers in the same signal path have transconductances controlled differentially in accordance with the control current from the current control circuit.

According to the second aspect of the invention, there is provided a semiconductor integrated circuit apparatus employed in an optical disk playback apparatus having a tracking control servo mechanism, the semiconductor integrated circuit apparatus comprising: a tracking error signal generation circuit which generates a tracking error signal, and which includes a tracking error balance adjustment circuit according to the first aspect of the invention, wherein the tracking control servo mechanism controls an irradiation light from an optical pickup in position on an optical disk in the radial direction thereof, in accordance with an output from the tracking error signal generation circuit, there by to control the irradiation light from the optical pickup to be kept on a track.

According to the third aspect of the invention, there is provided A current control circuit comprising: a first circuit receiving a control voltage and a reference potential, and outputting a current in accordance with the control voltage and the reference potential; a second circuit receiving the control voltage and the reference potential, and outputting a current in accordance with the control voltage and the reference potential; and a third circuit outputting a current output generated by adding the output of the first circuit and the output of the second circuit, wherein: the current output changes in accordance with different functions in a range where the control voltage input is lower than the reference potential and a range where the control voltage is not lower than the reference potential.

According to the fourth aspect of the invention, there is provided an optical disk playback apparatus comprising: an optical pickup for reading information data recorded on an optical disk and generating an RF signal corresponding to the information data; a head amplifier for amplifying the output signal from the pickup; and a variable gain amplifier receiving an output signal from the head amplifier, and outputting an output signal with a predetermined amplitude by adjusting the output signal from the head amplifier in amplitude, wherein the variable gain amplifier includes a current control circuit according to the third aspect of the invention.

According to the fifth aspect of the invention, there is provided an equalizing filter for an optical disk playback apparatus, inserted in a signal path of an RF signal generated by an optical pickup for reading information data recorded on an optical disk, the equalizing filter comprising: a first low-pass filter receiving the RF signal on the signal path; a high-pass filter receiving the RF signal on the signal path; an adder circuit receiving output signals from the first low-pass filter and the high-pass filter; and a second low-pass filter receiving an output signal from the adder circuit, wherein: the first low-pass filter, the high-pass filter, and the second low-pass filter each include a variable gain amplifier circuit, the variable gain amplifier circuit having: a current control circuit according to the third aspect of the invention; and a gm amplifier including an amplifier transistor, the transconductance of the gm amplifier varying by controlling a collector current of the amplifier transistor in accordance with the current output from the current control circuit.

According to the sixth aspect of the invention, a current control circuit comprising: a first circuit receiving a control voltage and a reference potential, and outputting a current in accordance with the control voltage and the reference potential; and at least one current generating circuit receiving the control voltage and the reference potential, and outputting a current in accordance with the control voltage and the reference potential, a current output of the current control circuit being generated by adding the current from the at least one current generating circuit to the current from the first circuit, wherein: change characteristic of the current output of the current control circuit follows different functions in respective sections of an expected range of a control voltage input, the range being divided into the respective sections by different reference potentials as inflection points.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1A to 1D are views showing different examples of the irradiation positions of laser beams (main beam M and two sub-beams E and F) on the track of a disk in order to explain tracking control in a CD-ROM playback apparatus.

FIG. 3 is a block diagram schematically showing a conventional optical disk playback apparatus.

DETAILED DESCRIPTION OF THE INVENTION

Embodiments according to the present invention will be described with reference to the accompanying drawing.

Figure 6:
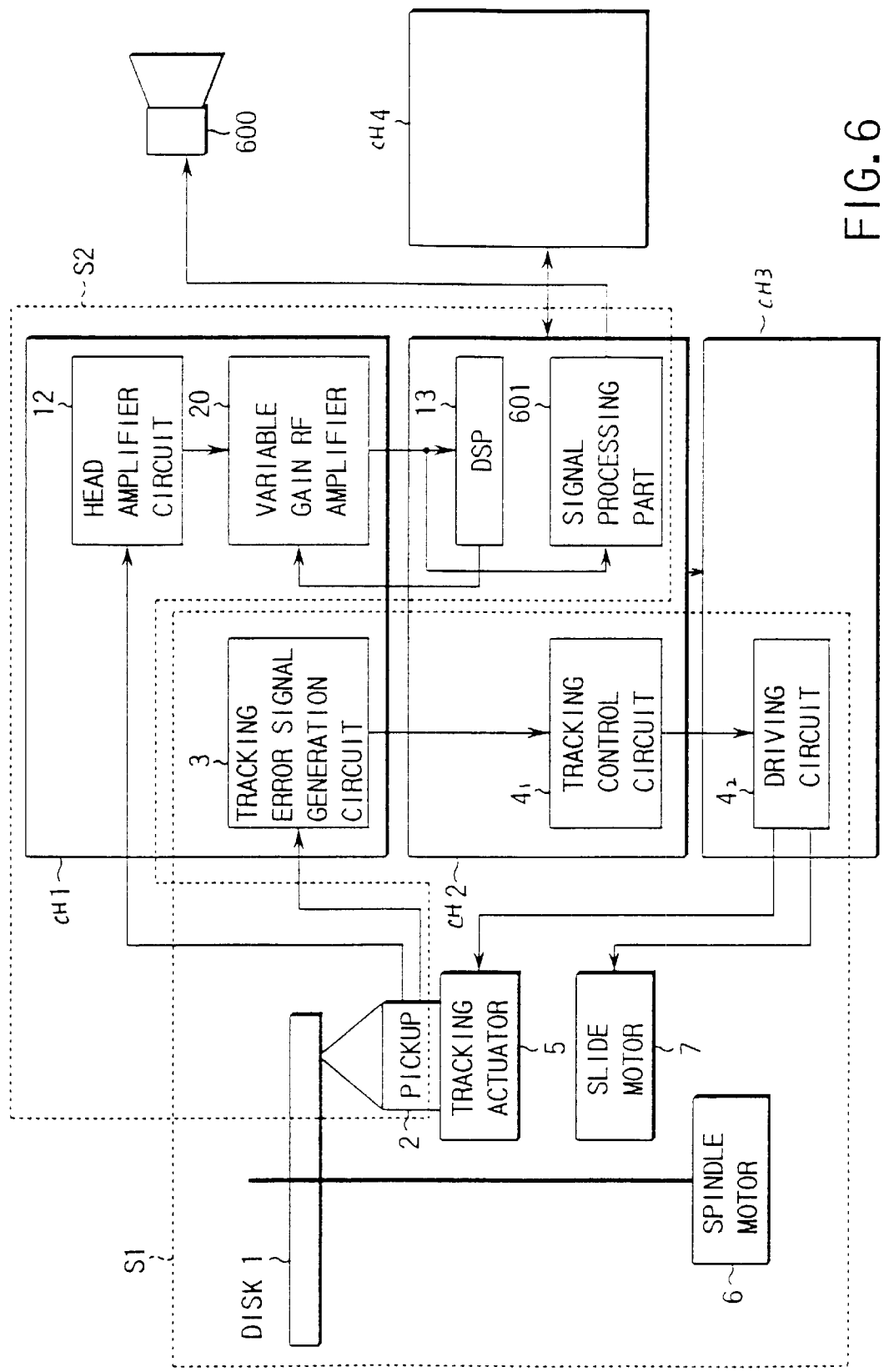
FIG. 6 is a schematic block diagram illustrating a main part of an optical disk playback apparatus to which the present invention is applied.

FIG. 6 is a schematic block diagram illustrating a main part of an optical disk playback apparatus to which the present invention is applied.

The optical disk playback apparatus has an optical pickup 2, a spindle motor 6 for rotating an optical disk 1, a tracking actuator 5 for moving an irradiation light in position from the pickup 2 in the radius direction of the optical disk 1, and slide motor 7 for driving a sliding actuator (not shown) for moving the pickup 2 in the radius direction of the disk 1, in order to transfer the laser beam to a desired track position on the disk 1.

The optical pickup 2 projects a laser beam on the optical disk 1, and generates and outputs an electric signal in response to an optical beam reflected from the disk, or the like. The electric signal output from the optical pickup 2 is supplied to a head amplifier CH1 which is, for example, a single semiconductor integrated circuit. The head amplifier CH1 amplifies the output signals from the optical disk 1, performing a waveform equalization process to generate a information signal, while generates a tracking error signal on the basis of the signal from the optical disk 1.

The information signal and the tracking error signal from the head amplifier CH1 are then supplied to processor CH2, which is, for example, a single semiconductor integrated circuit. The processor CH2 adjusts the information signal to keep the signal substantially constant in amplitude, and digitizes the adjusted information signal, to supply the digitized signal to output part 600 for reproducing information recorded by the optical disk 1. In addition, the processor CH2 receives the tracking error signal, to compensate the tracking error signal in gain and phase, thereby to generate a tracking control signal. The tracking control signal is supplied to driver CH3, which generates a driving signal on the basis of the tracking control signal. The driving signal is transferred to tracking actuator 5 and the sliding actuator, so that the movement thereof may be controlled accordingly.

A system controller CH4 is connected to processor CH2, to control the operation of the processor CH2 and driver CH3.

The head amplifier CH1 has a tacking error signal generating circuit 3. The processor CH2 has a tracking controlling circuit $4_1$. The driver CH3 includes a driving circuit $4_2$. A system including a circuit constituted by those will be referred to a first system S1.

The head amplifier CH1 also has a head amplifier circuit 12, and a variable gain RF amplifier 20. The processor CH2 involves a digital servo processor (DSP) 13, as well as a signal processing circuitry 601 comprising a digitizer circuit, a PLL circuit, and a digital processing circuit, which will be referred to later. A system including a circuit constituted by those is referred to a second system S2.

[First Embodiment of the Invention]

Figure 7:
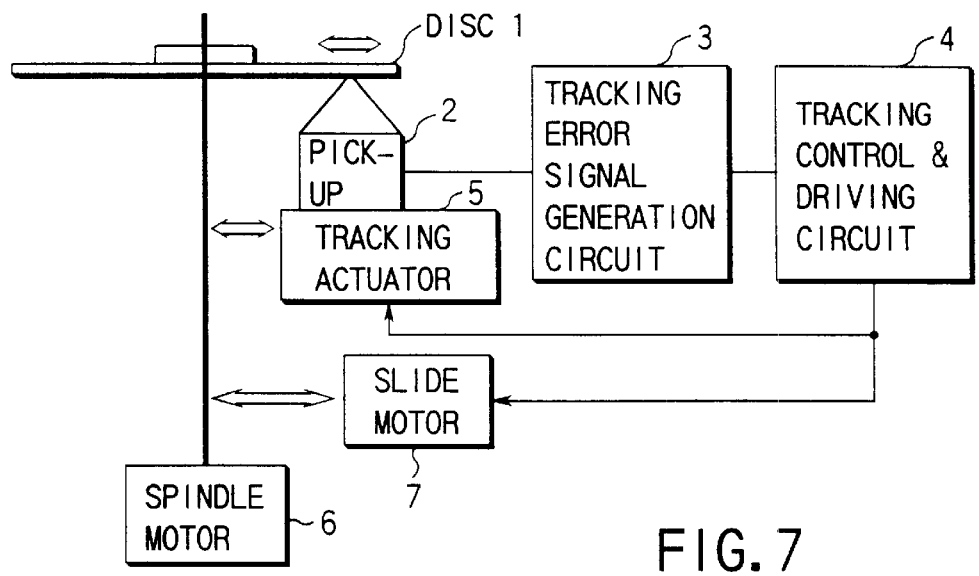
FIG. 7 is a block diagram showing part of a CD-ROM playback apparatus according to the first embodiment of the present invention.

In FIG. 7, a disk 1 serving as a recording carrier generally holds digital information data on spiral tracks. The disk 1 is placed on a predetermined position and rotated at a predetermined rotational speed by a spindle motor 6.

An optical pickup 2 incorporates a semiconductor laser, photoelectric converter, and the like. The pickup 2 emits a laser beam to a track on the disk 1, detects a change in quantity of laser beam reflected back from the track or transmitting through the track, converts information data into an electrical signal (e.g., an analog signal of 1 to 40 MHz), and outputs the signal.

A tracking error signal generation circuit 3 is included in a head amplifier for performing amplification/wave equalization processing for an output signal from the pickup 2, and generating an information signal including information recorded on the disk 1. The tracking error signal generation circuit 3 generates a tracking error signal representing a relative positional shift in the radial direction of the disk between a track and a laser beam.

Although not shown, an output signal (information signal) from the head amplifier is amplified by a variable gain amplifier, and at the same time adjusted to have a substantially constant amplitude of a predetermined value suitable for subsequent signal processing by an automatic gain control loop using a DSP (Digital Servo Processor). An output signal from the variable gain amplifier is sent to a binarization circuit where the signal is converted into a binary signal of "H" or "L" with reference to a predetermined slice level. This binary signal is input to a phase-locked loop to generate a clock signal synchronized with the binary signal. The clock signal and binary signal are input to a digital signal processing circuit, which performs demodulation/error correction to play back an information signal recorded on the optical disk.

A tracking control & driving circuit 4 is incorporated in the DSP. The circuit 4 receives a tracking error signal from the tracking error signal generation circuit 3, executes gain compensation and phase compensation in order to ensure an open-loop gain and phase margin necessary for the tracking servo, and generates a tracking control signal. The driving drives a tracking actuator 5 in accordance with the tracking control signal to move the position of irradiation light from the pickup 2 radially along the disk.

In this manner, the tracking control servo mechanism made up of the pickup 2, tracking control & driving circuit 4, tracking actuator 5, and the like maintains the position of irradiation light from the pickup 2 on the track of the disk 1.

To move the laser beam to a desired track position on the disk 1, a slide motor 7 drives a sliding actuator to move the pickup 2 radially along the disk.

Figure 2:
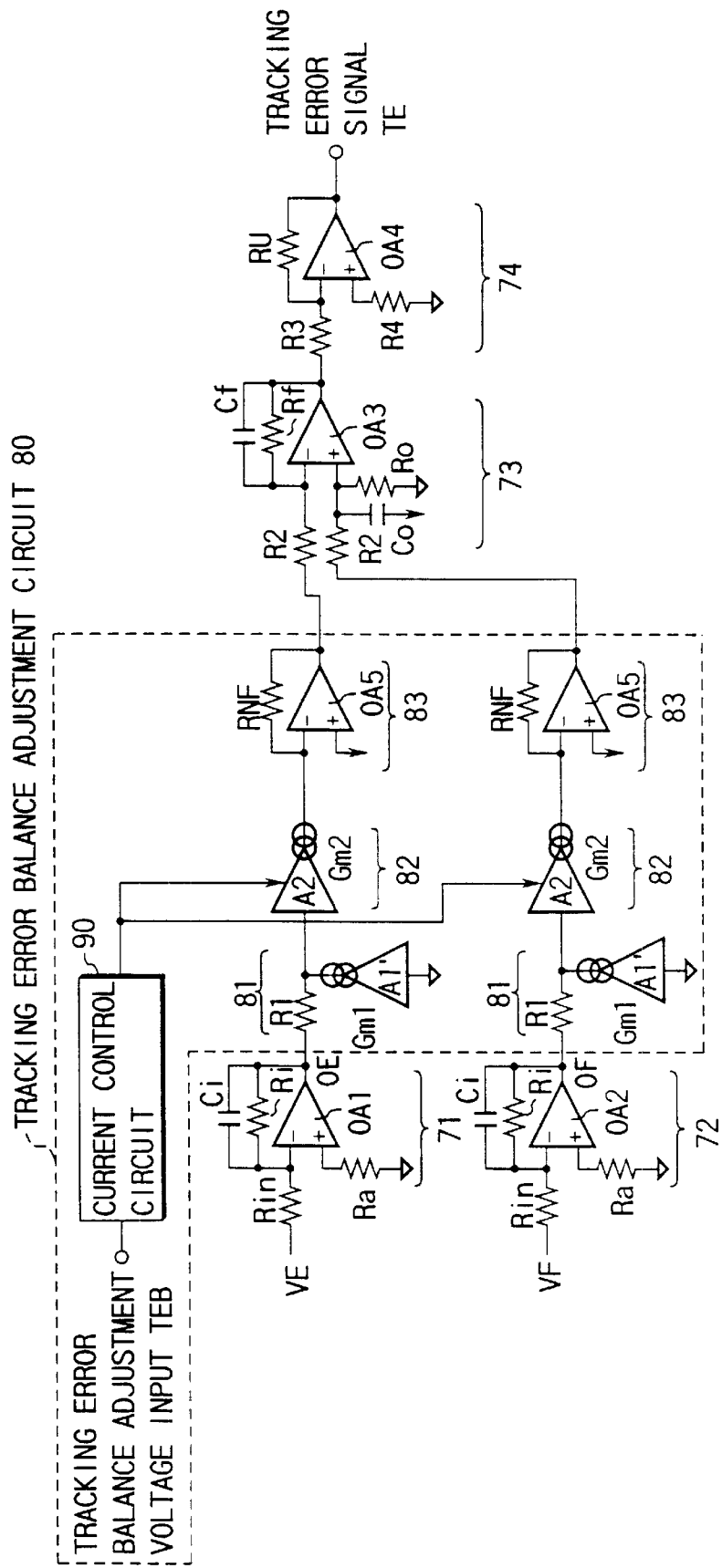
FIG. 2 is a block diagram showing a tracking error signal generation circuit in a conventional CD-ROM playback apparatus.

FIG. 2 shows an example of the tracking error signal generation circuit 3 in FIG. 7.

The tracking error signal generation circuit 3 is integrated in a semiconductor integrated circuit. Similar to the conventional tracking error signal generation circuit shown in FIG. 2, this tracking error signal generation circuit 3 comprises a first current-to-voltage conversion circuit 71, second current-to-voltage conversion circuit 72, adder circuit 73, gain adjustment circuit 74, and tracking error balance adjustment circuit 20.

More specifically, in the first current-to-voltage conversion circuit 71, a resistive element Ri and capacitive element Ci are parallel-connected between the (−) input terminal and output terminal of an operational amplifier circuit OA1. A resistive element Ra is connected between the (+) input terminal of the operational amplifier circuit OA1 and a reference potential. The first current-to-voltage conversion circuit 71 receives via an input resistor Rin an output signal (RF signal) VE from a first photodiode corresponding to a first sub-beam E of two sub-beams. Then, the circuit 71 performs current-to-voltage conversion and removes a high-frequency component.

The second current-to-voltage conversion circuit 72 has the same arrangement as that of the first current-to-voltage conversion circuit 71. The second current-to-voltage conversion circuit 72 receives an output signal (RF signal) VF from a second photodiode corresponding to a second sub-beam F of the two sub-beams. Then, the circuit 72 performs current-to-voltage conversion and removes a high-frequency component.

Output voltages from the two current-to-voltage conversion circuits 71 and 72 are adjusted by the tracking error balance adjustment circuit 20, and differentially input to the adder circuit 73 via resistive elements R2. An output from the adder circuit 73 is input to the gain adjustment circuit 74 via a resistive element R3.

In the adder circuit 73, a feedback resistive element Rf and a capacitive element Cf for passing a high-frequency component are parallel-connected between the (−) input terminal and output terminal of an operational amplifier circuit OA3. A resistive element Ro and a capacitive element Co for removing a high-frequency component are parallel-connected between the reference potential and the (+) input terminal of the operational amplifier circuit OA3.

In the gain adjustment circuit 74, a feedback resistor Ru adjustable by the user is connected (e.g., externally connected to an LSI) between the (−) input terminal and output terminal of an operational amplifier circuit OA4. A resistive element R4 is connected between the reference potential and the (+) input terminal of the operational amplifier circuit OA4.

If a tracking error signal TE output from the gain adjustment circuit 74 is 0, the two sub-beams E and F are at ideal irradiation positions; and if the tracking error signal TE shifts in a (+) or (−) direction, the two sub-beams E and F shift from ideal irradiation positions to one side along the track width.

The tracking error balance adjustment circuit 20 according to the present invention is different in the following points from the conventional tracking error balance adjustment circuit 80 shown in FIG. 2.

(1) A first gm amplifier A1' is commonly controlled by the same control current as that for a second gm amplifier A2 on the output side, and the transconductances gm of the gm amplifiers A1' and A2 are controlled.

(2) Gm1 of the first gm amplifier A1' and Gm2 of the second gm amplifier A2 in the same system are differentially controlled in opposite increase/decrease directions.

Figure 8:
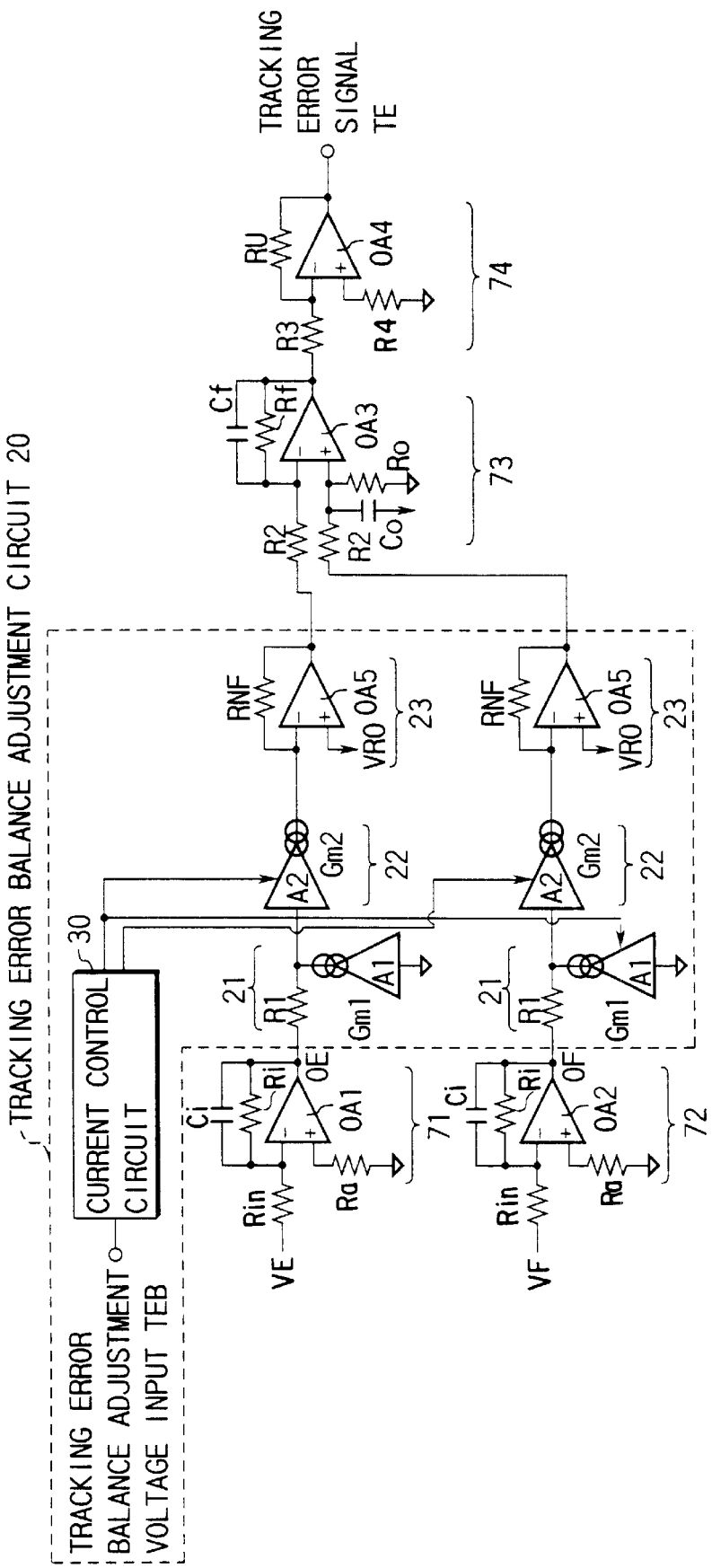
FIG. 8 is a block diagram showing an example of a tracking error signal generation circuit in FIG. 7.

That is, the tracking error balance adjustment circuit 20 in FIG. 8 includes two current-controlled variable gain control circuits in correspondence with an input voltage OE from the first current-to-voltage conversion circuit 71 for converting the E signal, and an input voltage OF from the second current-to-voltage conversion circuit 72 for converting the F signal.

The gains of the two variable gain control circuits are controlled by an output current (control current) prepared by converting a DC tracking error balance adjustment voltage TEB generated by another means (e.g., DSP) into a current by a current control circuit 30. In the first embodiment, each variable gain control circuit is formed from a bipolar circuit.

The inputs voltages OE and OF of these circuits are respectively input to variable gain control circuits 22 via current-controlled variable attenuation circuits 21. The output side of each variable gain control circuit 22 is connected to an output circuit 23.

More specifically, the attenuation circuit 21 is made up of an input impedance element (e.g., the input resistor R1) connected between a signal input node and an attenuation output node, and the first gm amplifier A1' of variable gm type which is connected between the attenuation output node and an AC ground node to have an equivalent resistive element, and has gm that changes in accordance with the control current.

The variable gain control circuit 22 uses the second gm amplifier A2 of variable gm type in which gm changes in accordance with the control current. The output circuit 23 is comprised of an operational amplifier circuit OA5 which receives an output signal from the second gm amplifier A2 to an inverting input terminal (−) and has a non-inverting input terminal (+) connected to a reference potential VRO, and a feedback resistor RNF connected between the inverting input terminal (−) and output terminal of the operational amplifier circuit OA5.

As described above, the first and second gm amplifiers A1' and A2 commonly controlled by the same control current are differentially controlled to change (increase/decrease) Gm1 of the first gm amplifier A11 and Gm2 of the second gm amplifier A2 in opposite directions.

Note that gm variations including the temperature coefficient of the second gm amplifier A2 are canceled by connecting the first gm amplifier A1' to the second gm amplifier A2.

A gain G of the signal path of the input resistor R1, first gm amplifier A1', second gm amplifier A2, and output circuit 23 is given by:

$$G=Gm2 \cdot RNF/(1+Gm1 \cdot R1) \quad (1)$$

In the first embodiment, the two circuits are commonly controlled by the control current, and at the same time, differentially controlled to increase the gain of one circuit and decrease the gain of the other circuit.

Note that it is also possible to fix the gain of one circuit without supplying any control current, and to control the gain of the other circuit by supplying the control current.

Figure 9:
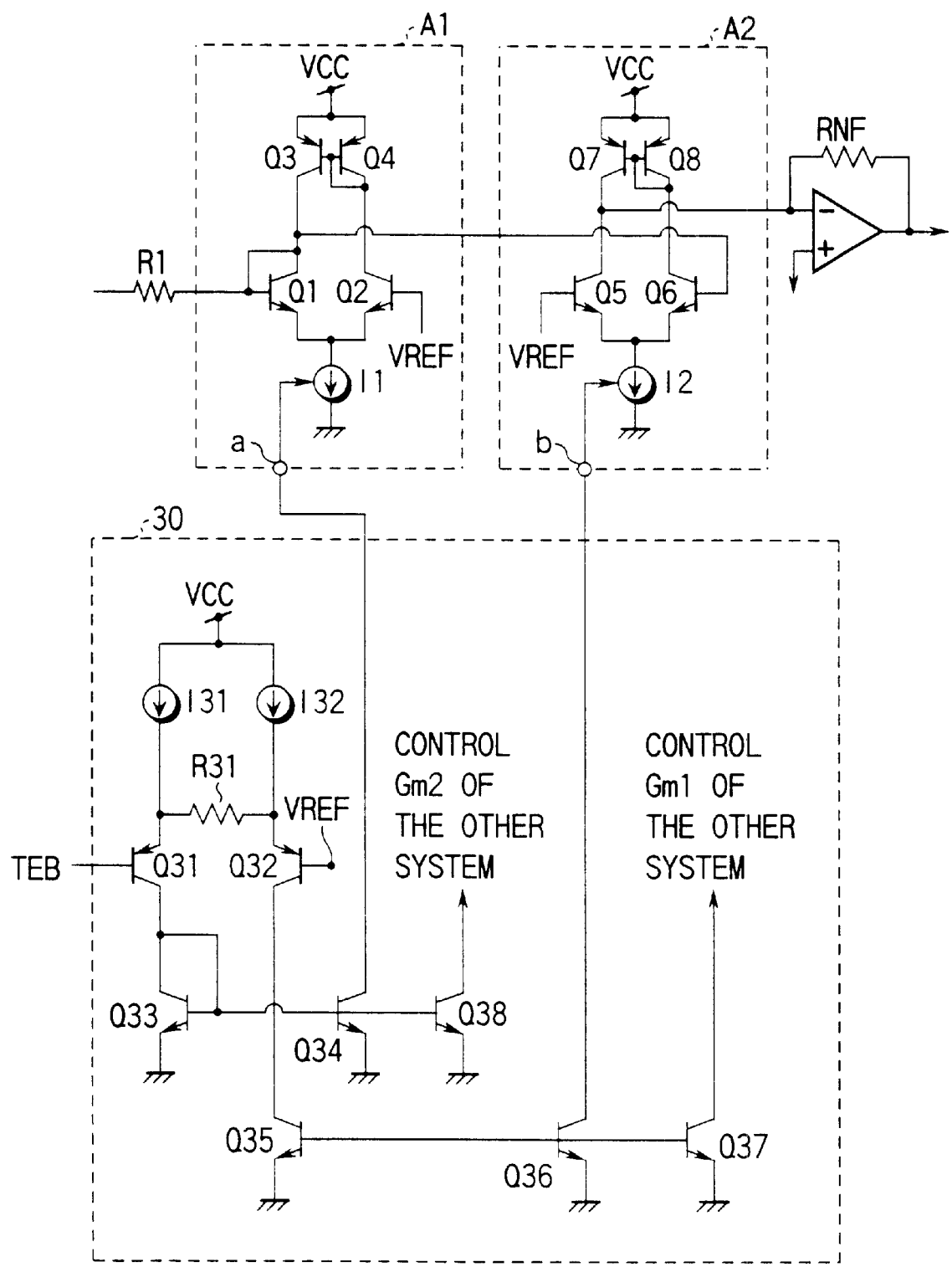
FIG. 9 is a circuit diagram showing one representative system in a tracking error balance adjustment circuit in FIG. 8 together with a current control circuit.

FIG. 9 shows an example of one circuit in the tracking error balance adjustment circuit 20 shown in FIG. 8, together with the current control circuit 30.

One terminal of the input resistor R1 is connected to a signal input node, and the other terminal of the input resistor R1 is connected to the first gm amplifier A1. The first gm amplifier A1 is made up of an NPN transistor Q1 having a collector and base connected to each other and a base connected to the other terminal of the input resistor R1, an NPN transistor Q2 having an emitter commonly connected to that of the transistor Q1 and a base biased to a reference potential VREF, a first current source I1 which is connected between the differential pair of transistors Q1 and Q2 and changes a current in accordance with the control current, a PNP transistor Q3 having a collector connected to that of the transistor Q1 and an emitter connected to a VCC node which receives a power supply potential VCC, and a PNP transistor Q4 having a base commonly connected to that of the transistor Q3, a collector and base connected to the collector of the transistor Q2, and an emitter connected to the VCC node.

With this arrangement, the collector currents of the differential amplification bipolar transistors Q1 and Q2 are controlled in accordance with the control current. Then, the transconductance gm changes, and an output signal is extracted from the collector of the transistor Q1.

The second gm amplifier A2 is made up of an NPN transistor Q5 having a base biased to the reference potential VREF, an NPN transistor Q6 having an emitter commonly connected to that of the transistor Q5 and a base connected to the output node of the first gm amplifier A1 (collector of the transistor Q1), a second current source I2 which is connected between a ground node and the common emitter node between the differential pair of transistors Q5 and Q6, and changes a current in accordance with the control current, a PNP transistor Q7 having a collector connected to that of the transistor Q5 and an emitter connected to a VCC node, and a PNP transistor Q8 having a base commonly connected to that of the transistor Q7, a collector and base connected to the collector of the transistor Q6, and an emitter connected to the VCC node.

With this arrangement, the collector currents of the differential amplification bipolar transistors Q5 and Q6 are controlled in accordance with the control current. Then, the transconductance gm changes, and an output signal is extracted from the collector of the transistor Q5.

In the current control circuit 30, third and fourth constant current sources I31 and I32 are respectively connected between a VCC node and the emitters of a differential pair of PNP transistors Q31 and Q32. A gain adjustment input resistive element R31 is connected between these emitters.

The collector of the PNP transistor Q31 is connected to the ground potential via the collector-emitter path of an NPN transistor Q33 having a collector and base connected to each other. The base and emitter of the NPN transistor Q33 are respectively connected (current-mirror-connected) to those of an NPN transistor Q34. The collector of the NPN transistor Q34 is connected to a gain control input node a of the first gm amplifier A1.

Similarly, the collector of the PNP transistor Q32 is connected to the ground potential via the collector-emitter path of an NPN transistor Q35 having a collector and base connected to each other. The NPN transistor Q35 is current-mirror-connected to an NPN transistor Q36. The collector of the NPN transistor Q36 is connected to a gain control input node b of the second gm amplifier A2.

Note that an NPN transistor Q37 current-mirror-connected to the NPN transistor Q35 and an NPN transistor Q38 current-mirror-connected to the NPN transistor Q33 are formed to control the first current source I1 of the NPN transistor Q1 and the second current source I2 of the second gm amplifier A2 in the other circuit.

In the current control circuit 30, the base of one transistor Q31 out of the differential pair of transistors Q31 and Q32 receives the balance adjustment voltage TEB, and the base of the other transistor Q32 is biased to the reference potential VREF. The collector currents of the PNP transistors Q31 and Q32, the collector currents of the NPN transistors Q33 and Q35, and the collector currents (control current outputs) of the NPN transistors Q34 and Q36 are differentially controlled in accordance with the level of the balance adjustment voltage TEB. The first current source I1 of the first gm amplifier A1 and the second current source I2 of the second gm amplifier A2 are respectively controlled in correspondence with these control current outputs.

More specifically, if the balance adjustment voltage TEB exceeds the reference potential VREF, the current of one PNP transistor Q31 out of the differential pair of transistors Q31 and Q32 decreases, and the current of the other PNP transistor Q32 increases.

To the contrary, if the balance adjustment voltage TEB becomes lower than the reference potential VREF, the current of one PNP transistor Q31 out of the differential pair of transistors Q31 and Q32 increases, and the current of the other PNP transistor Q32 decreases.

As a detailed method of controlling the first and second current sources I1 and I2 by the collector currents of the NPN transistors Q34, Q36, and Q38 in FIG. 9, the NPN transistor Q34 is used as the first current source I1 (i.e., the collector of the transistor Q34 is connected to the emitters of the differential pair of transistors Q1 and Q2). Further, the NPN transistor Q36 is used as the second current source I2 (i.e., the collector of the transistor Q36 is connected to the emitters of the differential pair of transistors Q5 and Q6).

Figure 10A:
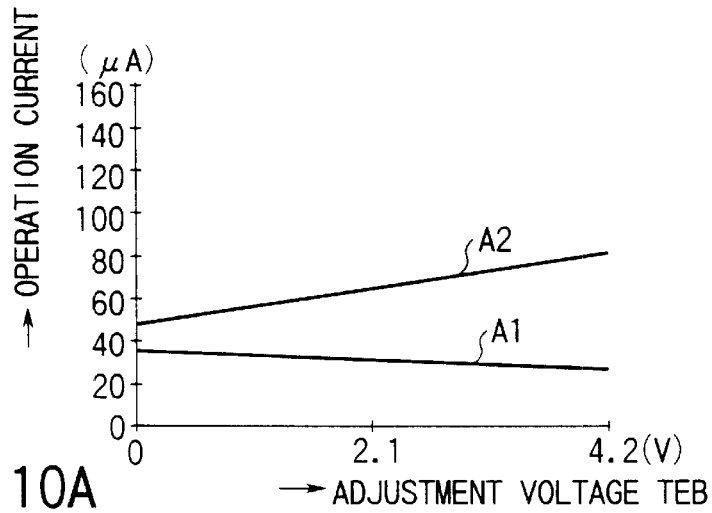
FIGS. 10A and 10B are graphs, respectively, showing an example of differential output currents (operating currents of respective gm amplifiers) and an example of the gain (logarithm expression) of one system of the balance adjustment circuit with respect to a balance adjustment voltage input to the current control circuit in FIG. 9.

FIG. 10A is a graph showing an example of differential output currents (operating currents of the respective gm amplifiers) of the current control circuit 30 in FIG. 9 with respect to the balance adjustment voltage TEB.

Figure 10B:
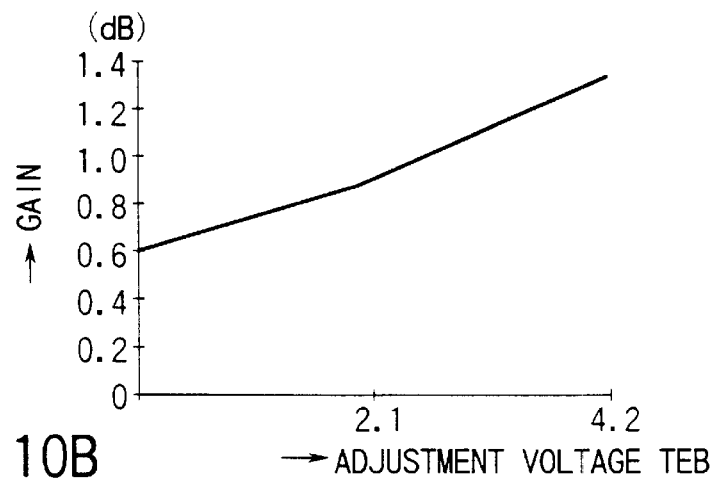

FIG. 10B is a graph showing an example of the gain (logarithm expression) of one system of the balance adjustment circuit 20 in the current control circuit 30 in FIG. 9 with respect to the balance adjustment voltage TEB.

In the characteristics shown in FIGS. 10A and 10B, assume that, when the adjustment voltage TEB changes, e.g., from 0V to 4.2V, the operating current of the first gm amplifier A1 changes from 40 $\mu$A to 26 $\mu$A, and the operating current of the second gm amplifier A2 changes from 50 $\mu$A to 80 $\mu$A.

For the adjustment voltage TEB of 0V, the operating current of the first gm amplifier A1 changes to 40 $\mu$A to maximize Gm1, and the operating current of the second gm amplifier A2 changes to 50 $\mu$A to minimize Gm2. As a result, the gain of one circuit minimizes.

To the contrary, for the adjustment voltage TEB of 4.2V, the operating current of the first gm amplifier A1 changes to 26 $\mu$A to minimize Gm1, and the operating current of the second gm amplifier A2 changes to 80 $\mu$A to maximize Gm2. As a result, the gain of one circuit maximizes.

According to the tracking error balance adjustment circuit 20 shown in FIG. 9, the same gain balance adjustment width as in the prior art can be ensured even with a smaller change in control current than in the prior art. Thus, Gm2 of the second gm amplifier A2 need not be set so small as to fail to drive RNF. In accordance with a reference value set small for Gm1 of the first gm amplifier A1, Gm2 of the second gm amplifier A2 can be set small to reduce the output offset.

Note that the arrangements of the gm amplifiers A1 and A2 and current control circuit 30 in the tracking error balance adjustment circuit 20 shown in FIG. 9 are not limited to the first embodiment, and can be variously modified.

In the tracking error balance adjustment circuit of this embodiment, a tracking error signal is generated in accordance with the level difference between the first and second signals E and F that complementarily change in level in accordance with the deviations of laser beam irradiation positions from the track center, as shown in FIGS. 1A to 1C. In this case, at least one of the levels of the signals E and F is corrected to set the level difference between the signals E and F to 0 when the laser beam irradiation positions coincide with the track center.

However, in the present invention, the tracking error signal generation method is not limited to this. For example, as shown in FIG. 1D, the first signal (A+C) and second signal (B+D) that complementarily change in level in accordance with the deviation of the irradiation position of the main beam M from the track center are used among signals A, B, C, and D detected by dividing the irradiation position of the main beam M into four by four photoelectric converters arranged in accordance with 2×2 regions A, B, C, and D. At least one of the levels of the first and second signals is adjusted by the tracking error balance adjustment circuit. Then, the first and second signals are differentially added to generate a tracking error signal in accordance with the level difference between the signals (A+C) and (B+D).

The tracking error balance adjustment circuit 20 of the present invention can also be applied to an optical disk playback apparatus capable of playing back a rewritable CD (CD-RW) as an optical disk in addition to a general CD. In this case, to cope with different characteristics between the general CD and CD-RW, a level correction switching circuit for switching correction performed for an output signal level from the head amplifier circuit 12 in accordance with a general CD playback mode/CD-RW playback mode is inserted in the output side of the head amplifier.

As has been described above, the present invention can provide a tracking error balance adjustment circuit in which the same gain balance adjustment width as in the prior art can be ensured even with a smaller change in control current than in the prior art, gm of the second gm amplifier need not be set so small as to fail to drive RNF, and the output offset can be reduced, and an optical disk playback apparatus using the same.

[Second Embodiment of the Invention]

Figure 11:
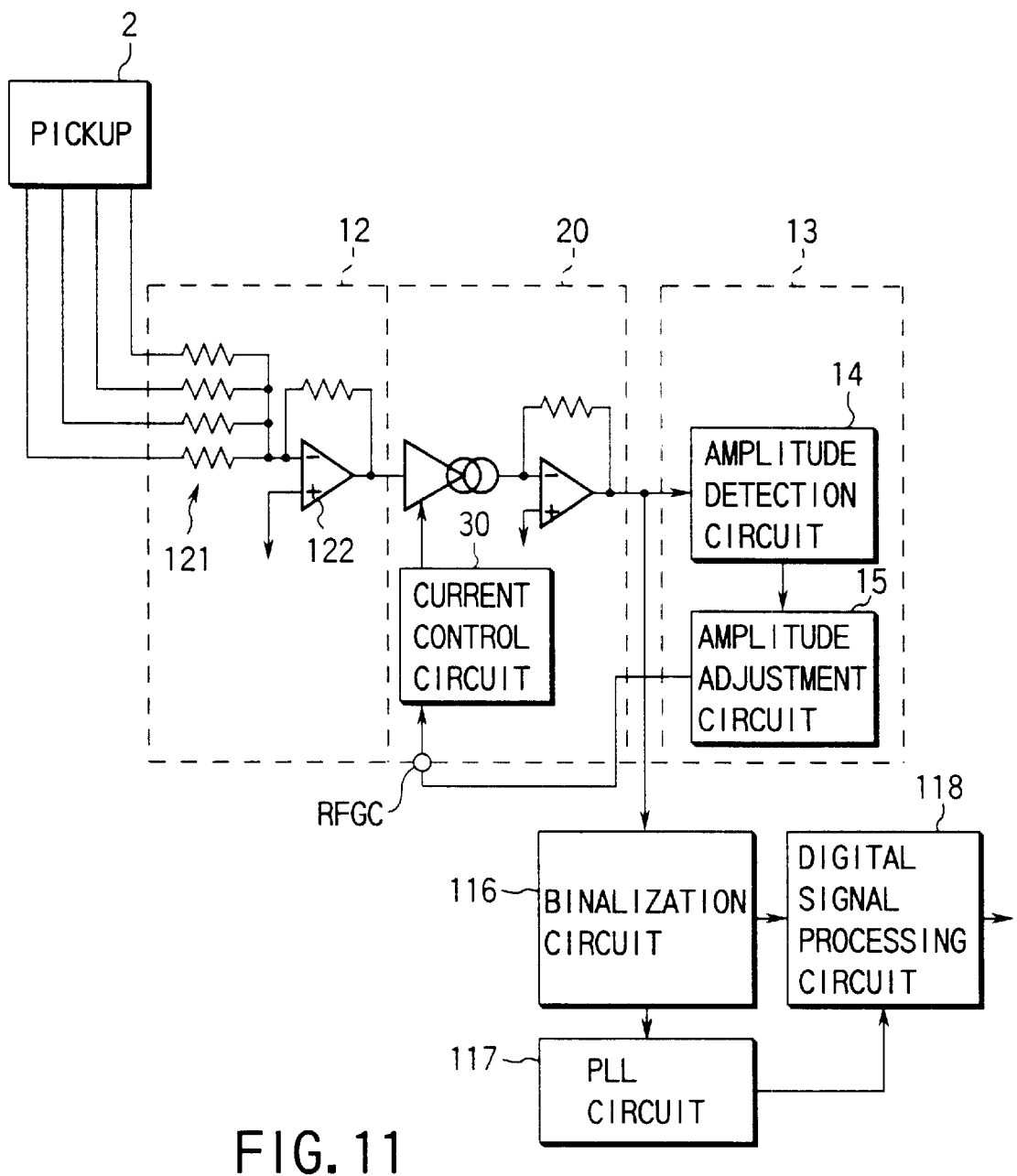
FIG. 11 is a block diagram showing a current control circuit, variable gain RF amplifier, and optical disk playback apparatus according to the first embodiment of the present invention.

FIG. 11 shows an optical disk playback apparatus using a variable gain amplifier including a current control circuit according to the second embodiment of the present invention.

In FIG. 11, an optical pickup 11 reads information data from an optically readable/writable optical disk (e.g., CD) when the optical disk is rotated by a motor, generates electrical signals corresponding to the information data, and outputs the signals as four RF signals.

A head amplifier circuit 12 adds (synthesizes) the four RF signals output from the pickup 11 by resistors 121, amplifies the sum by an operational amplifier circuit 122 with a predetermined gain, and performs wave equalization processing.

A variable gain RF amplifier 20 amplifies an output signal from the head amplifier circuit 12 with a gain corresponding to a gain control signal voltage RFGC. The variable gain RF amplifier 20 comprises a gm amplifier, and a current control circuit 30 for controlling a current flowing through the gm amplifier.

A DSP 13 compares the amplitude of an output signal from the variable gain RF amplifier 20 with a predetermined signal amplitude reference value serving as an adjustment target set in advance, and controls the gain of the variable gain RF amplifier 20 in accordance with the difference so as to set the amplitude of the output signal closer to the predetermined reference value (e.g., 1.5 Vp-p).

An example of the DSP 13 comprises an amplitude detection circuit 14 for detecting the upper and lower peak values of an output signal from the variable gain RF amplifier 20, calculating the difference between the detection results, and generating amplitude information of the output signal from the variable gain RF amplifier 20, and an amplitude adjustment circuit 15 for comparing an output signal from the amplitude detection circuit 14 with a predetermined signal amplitude reference value set in advance, generating a gain control signal voltage RFGC corresponding to the difference, and supplying the voltage RFGC to the variable gain RF amplifier 20. The DSP 13 forms an amplitude adjustment feedback control loop for controlling the amplitude of an output signal from the variable gain RF amplifier 20 to be closer to a predetermined reference value.

An example of the amplitude adjustment circuit 15 A/D-converts an input signal (output signal from the amplitude detection circuit), and accumulates the digital signal in an amplitude information register. The amplitude adjustment circuit 15 calculates the difference between the data accumulated in the amplitude information register and reference amplitude data set in advance in a reference amplitude information register. The amplitude adjustment circuit 15 multiplies the difference by a coefficient, and temporarily accumulates the product in an adjustment signal register. Then, the amplitude adjustment circuit 15 modulates the pulse width of the data in the adjustment signal register, and removes the carrier component of the modulated data by an LPF (Low-Pass Filter) to generate a gain control signal voltage RFGC.

Reference numeral 116 denotes a binarization circuit for receiving an output signal from the variable gain RF amplifier 20 and converting it into a binary signal of "H" or "L" with reference to a predetermined slice level; 117, a PLL circuit for receiving an output signal (binary signal) from the binarization circuit 116 and generating a clock signal synchronized with the binary signal; and 118, a digital signal processing circuit for receiving an output signal (clock signal) from the PLL circuit 117 and an output signal (binary signal) from the binarization circuit 116, performing demodulation/error correction, and playing back information data recorded on an optical disk.

The basic operation of the optical disk playback apparatus having the above arrangement will be explained.

An output signal from the pickup 11 which reads information data recorded on a rotated optical disk includes an AC component corresponding to the information data. The output signal from the pickup 11 is input to the head amplifier circuit 112 where the signal is subjected to wave equalization so as to obtain a waveform suitable for subsequent signal processing, and amplified with a predetermined gain. However, an output signal from the head amplifier circuit 12 varies in amplitude owing to variations in optical disk characteristics.

The output signal from the head amplifier circuit 12 is input to the variable gain RF amplifier 20. The variable gain RF amplifier 20 amplifies the input signal with a variable gain corresponding to the gain control signal voltage RFGC of the amplitude adjustment control loop using the DSP 13, and controls the amplitude of an output signal to be closer to a predetermined reference value.

This enables detecting not only variations in amplitude of a pickup output signal caused by variations in characteristics of optical disks to be played back, but also variations in amplitude of a pickup output signal caused by changes in the pickup 11 over time and changes in emission amount of the semiconductor laser of the pickup. Against these variations, the amplitude of an output signal from the variable gain RF amplifier 20 can be adjusted. Hence, the binarization circuit 116, PLL circuit 117, and digital signal processing circuit 118 can accurately play back information data.

Note that the head amplifier circuit 12 may be omitted.

Figure 12:
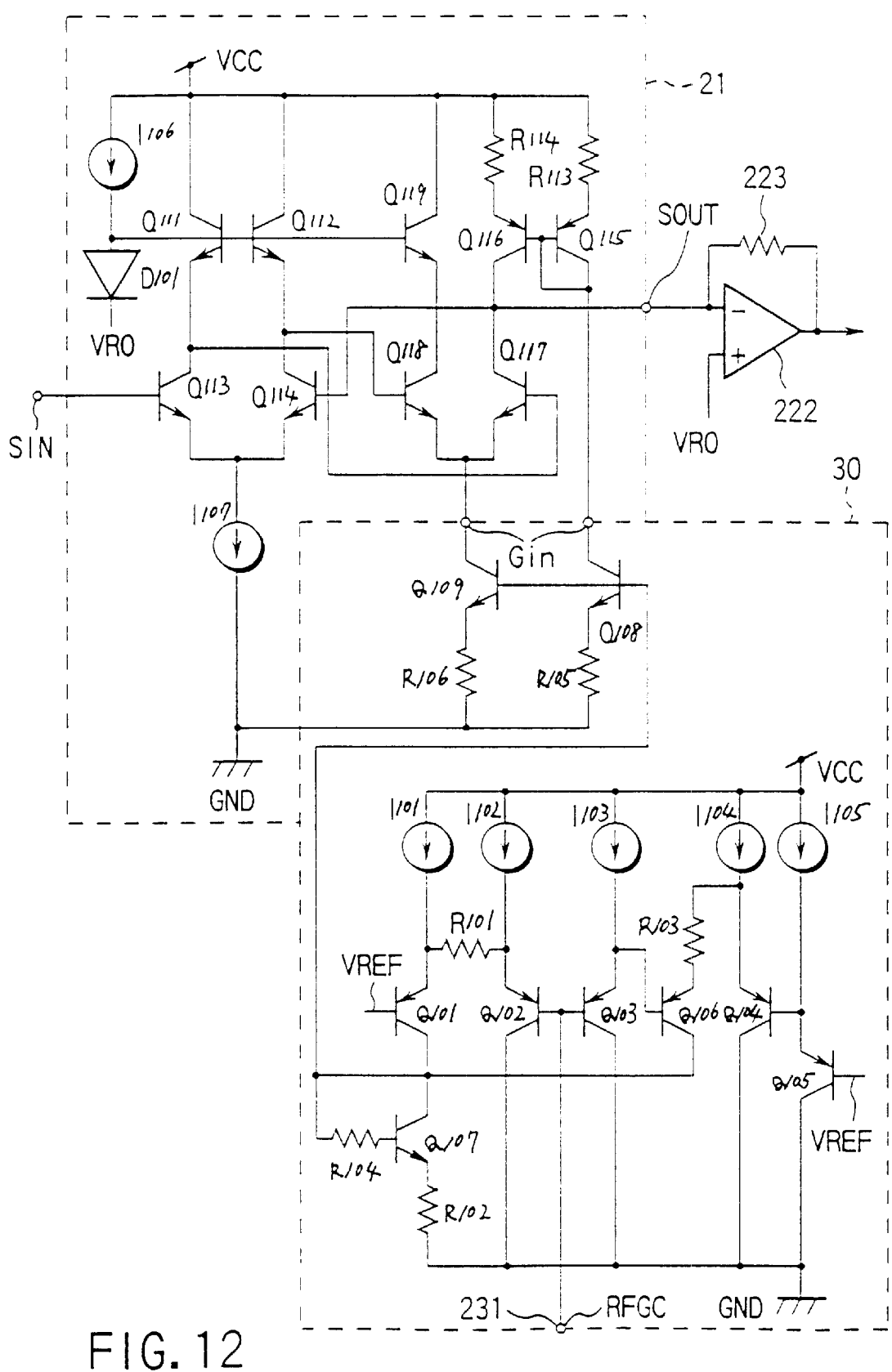
FIG. 12 is a circuit diagram showing an example of the variable gain RF amplifier in FIG. 11.

FIG. 12 shows an example of the variable gain RF amplifier 20 in FIG. 11.

Figure 4:
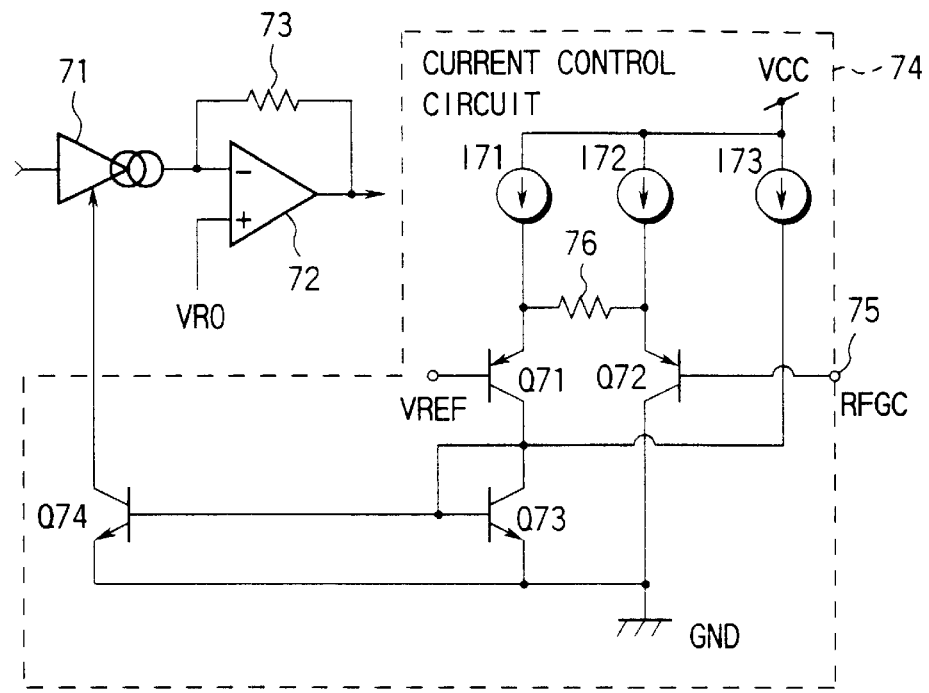
FIG. 4 is a circuit diagram showing an arrangement of a variable gain RF amplifier in FIG. 3.
Figure 5A:
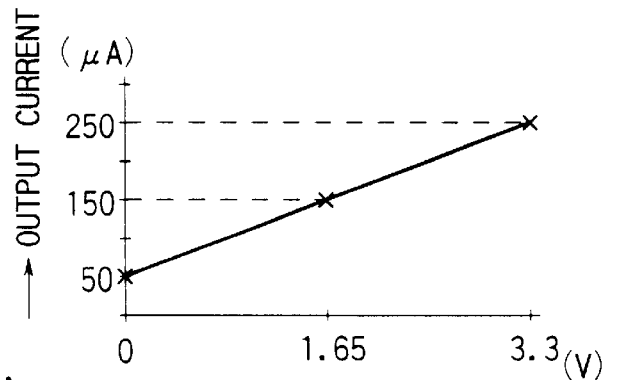
FIGS. 5A and 5B are graphs, respectively, showing an output current characteristic of a current control circuit in FIG. 4 with respect to the control voltage input and a gain characteristic of a gm amplifier in FIG. 4 with respect to the control voltage input.
Figure 5B:
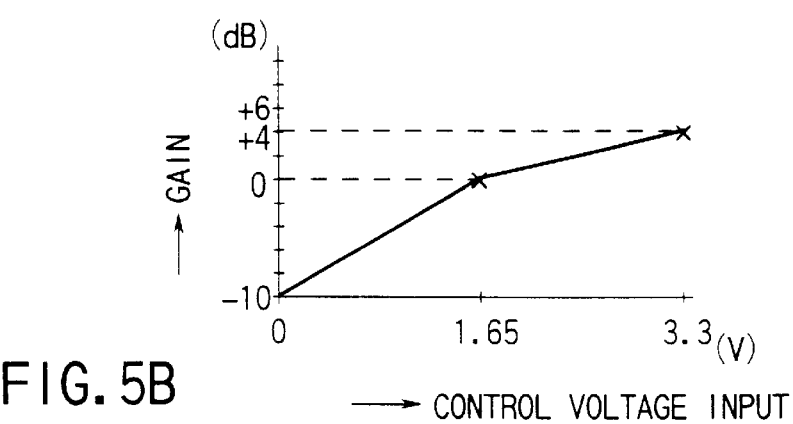

The variable gain RF amplifier 20 is the same as the conventional variable gain RF amplifier shown in FIG. 4 except for the arrangement of the current control circuit 30.

In FIG. 12, reference numeral 21 denotes a bipolar type gm amplifier; 222, a bipolar type operational amplifier circuit having an inverting input terminal (−) for receiving an output signal from the gm amplifier 21 and a non-inverting input terminal (+) connected to a reference potential VRO; and 223, a feedback resistor connected between the inverting input terminal (−) and output terminal of the operational amplifier circuit 222. The bipolar type current control circuit 30 controls the collector current of the amplifier transistor of the gm amplifier 21 in accordance with the input level of the control voltage RFGC.

The current control circuit 30 in FIG. 12 is constituted as follows. Of a differential pair of transistors Q101 and Q102, the base of one transistor Q101 is biased to a proper reference potential VREF, whereas the base of the other transistor Q102 receives the control voltage RFGC. The magnitude of a current output is controlled in accordance with the level of the control voltage RFGC, and the collector current of an amplifier transistor Q117 of the gm amplifier 21 is controlled in accordance with this current output. An example of the current control circuit 30 is shown in FIG. 12.

More specifically, constant current sources I101 and I102 are respectively connected between a VCC node for receiving a power supply potential VCC, and the emitters of the differential pair of PNP transistors Q101 and Q102. A gain adjustment resistor R101 is connected between these emitters.

The collector of the PNP transistor Q102 is connected to GND, whereas the collector of the PNP transistor Q101 is connected to GND via the collector-emitter path of an NPN transistor Q107 having a collector and base connected to each other, and a resistor R102. A constant current source I103 and the emitter-collector path of a PNP transistor Q103 are series-connected between the VCC node and GND. Similarly, a constant current source I104 and the emitter-collector path of a PNP transistor Q104 are series-connected, and a constant current source I105 and the emitter-collector path of a PNP transistor Q105 are series-connected.

The emitter of the PNP transistor Q105 is connected to the base of the PNP transistor Q104. A resistor R103 and the emitter-collector path of a PNP transistor Q106 are series-connected between the emitter of the PNP transistor Q104 and the collector of the NPN transistor Q107. The base of the PNP transistor Q106 is connected to the emitter of the PNP transistor Q103. Note that the value of the resistor R103 is set, e.g., double the value of the resistor R101.

The bases of the differential pair of PNP transistors Q101 and Q102 respectively receive the reference potential VREF, and the control voltage RFGC input from the DSP 13 in FIG. 11 via a control voltage input terminal 31. The bases of the PNP transistors Q105 and Q103 respectively receive the reference potential VREF and control voltage RFGC.

A resistor R104 is connected between the collector-base path of the NPN transistor Q107, and the base of the NPN transistor Q107 is connected to the bases of NPN transistors Q108 and Q109 via the resistor R104.

The emitter of the NPN transistor Q108 is connected to GND via a resistor R105, whereas the emitter of the NPN transistor Q109 is connected to GND via a resistor R106. That is, the NPN transistors Q108 and Q109 are current-mirror-connected to the NPN transistor Q107.

The collectors of the NPN transistors Q108 and Q109 serve as control current output nodes, and are connected to control input nodes of the gm amplifier 21.

The operation of the current control circuit 30 having this arrangement will be explained.

If the control voltage RFGC exceeds the reference potential VREF, the current of one PNP transistor Q102 out of the differential pair of transistors Q101 and Q102 decreases, and the current of the other PNP transistor Q101 increases. In a range where the control voltage RFGC is higher than the reference potential VREF, one transistor Q103 out of the PNP transistors Q103 and Q105 is turned off to turn off the transistor Q106.

To the contrary, if the control voltage RFGC becomes lower than the reference potential VREF, the current of one PNP transistor Q102 out of the differential pair of transistors Q101 and Q102 increases, and the current of the other PNP transistor Q101 decreases. In a range where the control voltage RFGC is lower than the reference potential VREF, one transistor Q103 out of the PNP transistors Q103 and Q105 flows a current in accordance with the control voltage RFGC, and the transistor Q106 also flows a current. The current of the transistor Q106 flows into the collector of the NPN transistor Q107.

As a result, the change amount, which is compensated by a current flowing from Q106, of the collector current of the NPN transistor Q107 with respect to changes in control voltage RFGC in the range where the control voltage RFGC is lower than the reference potential VREF becomes smaller than the change amount of the collector current of the NPN transistor Q107 with respect to changes in control voltage RFGC in the range where the control voltage RFGC is higher than the reference potential VREF.

Even if the control voltage RFGC drops excessively to turn off the PNP transistor Q101 out of the differential pair of transistors Q101 and Q102, the NPN transistor Q107 receives a current corresponding to the control voltage RFGC from the constant current source I104 via the resistor R103 and PNP transistor Q106.

The currents of the NPN transistors Q108 and Q109 are controlled in accordance with the current of the NPN transistor Q107, thereby controlling the magnitude of the collector current of the amplifier transistor Q117 in the gm amplifier 21.

In the gm amplifier 21 in FIG. 12, a transconductance gm is changed by controlling the collector current of the amplifier transistor. An example of the gm amplifier 21 is shown in FIG. 12.

In the gm amplifier 21 of FIG. 12, a current source I106 and diode D101 are series-connected between a VCC node and GND. The common connection node between the current source I106 and the anode of the diode D101 is connected to the bases of NPN transistors Q111, Q112, and Q119. The collectors of the transistors Q111, Q112, and Q119 are connected to the VCC node.

The bases of a first differential pair of NPN transistors Q113 and Q114 are respectively connected to a signal input node SIN and signal output node SOUT. A constant current source I107 is connected between the common emitter connection point and ground node.

Of the differential pair of transistors Q113 and Q114, the collector of one transistor Q113 is connected to the emitter of the transistor Q111, and the collector of the other transistor Q114 is connected to the emitter of the transistor Q112.

The emitter of a PNP transistor Q115 having a base and collector connected to each other is connected to the VCC node via a resistor R113. The base of the PNP transistor Q115 is connected to that of a PNP transistor Q116, and a resistor R114 is connected between the emitter of the PNP transistor Q116 and the VCC node.

The bases of a second differential pair of NPN transistors Q117 and Q118, which have emitters connected to each other, are respectively connected to the collectors of the transistors Q113 and Q114. The collector of one transistor Q117 is connected to that of the transistor Q116, whereas the collector of the other transistor Q118 is connected to that of the transistor Q119.

The collector of the transistor Q115 is connected to that of the transistor Q108 of the current control circuit 30. The common emitter connection node between the NPN transistors Q117 and Q118 is connected to the collector of the transistor Q109 of the current control circuit 30.

In the gm amplifier 21 having this arrangement, the magnitude of the current of the PNP transistor Q115 and at the same time the magnitudes of the collector currents of the NPN transistors Q117 and Q118 are controlled in accordance with a control input to the control gain input node.

Hence, the amplification gain of an RF signal input to the signal input node SIN is controlled in accordance with a control input to a gain control input terminal Gin. The resultant signal is output from the collector (signal output node SOUT) of the transistor Q117.

Figure 13A:
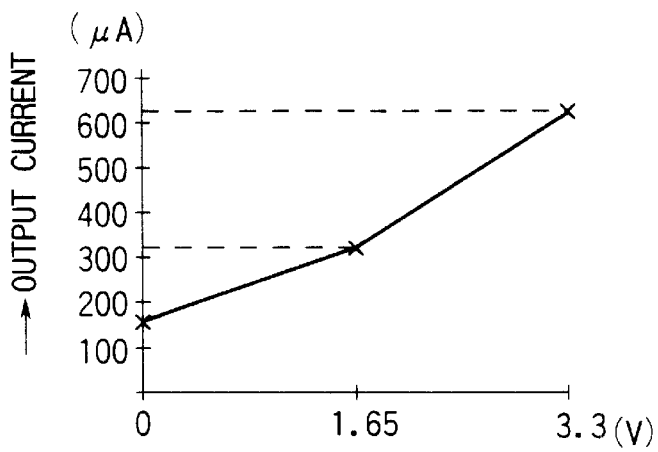
FIGS. 13A and 13B are graphs, respectively, showing an output current characteristic of the current control circuit in FIG. 12 with respect to a control voltage input, and a gain (logarithm expression) characteristic of a gm amplifier with respect to the control voltage input.
Figure 13B:
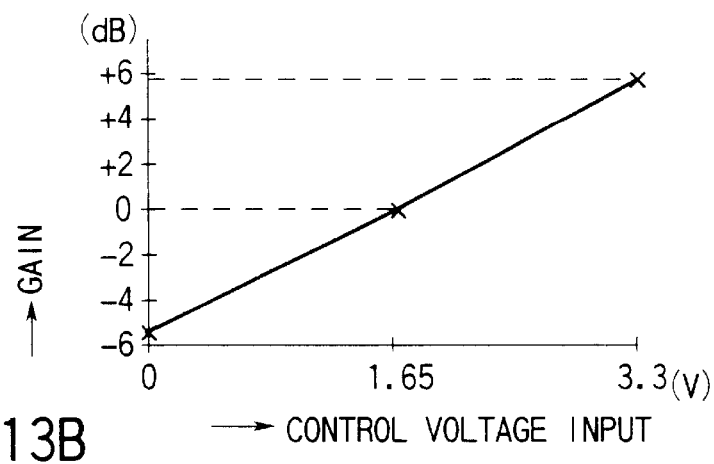

FIG. 13A shows an output current characteristic of the current control circuit 30 in FIG. 12 with respect to the control voltage RFGC. FIG. 13B shows a gain (logarithm expression) characteristic of the gm amplifier 21 with respect to the control voltage RFGC in the current control circuit 30 in FIG. 12.

In the characteristic shown in FIG. 13A, assuming that an output current IREF is 320 $\mu$A for the control voltage RFGC of 1.65V (reference potential VREF), the output current is 170 $\mu$A (smaller than IREF by 150 $\mu$A) for the control voltage RFGC of 0V, and is 620 $\mu$A (larger than IREF by 300 $\mu$A) for the control voltage RFGC of 3.3V. That is, the current output linearly changes with respect to changes in control voltage RFGC both in the range where the control voltage RFGC is lower than the reference potential VREF and the range where the control voltage RFGC is higher than the reference potential VREF. As for the control sensitivity, the change slope is different between the two ranges.

In the characteristic shown in FIG. 13B, assuming that the gain is 0 dB for the control voltage RFGC of 1.65V, the gain is 20 log(170/320)=−5.5 dB for the control voltage RFGC of 0V, and is 20 log(620/320)=+5.7 dB for the control voltage RFGC of 3.3V. That is, the control voltage RFGC linearly changes both in the range where the control voltage RFGC is lower than the reference potential VREF and the range where the control voltage RFGC is higher than the reference potential VREF. The control sensitivity is almost equal between the two ranges.

In other words, when the control voltage RFGC input to the current control circuit 30 increases and decreases equally by 1.65V from the reference potential VREF, the gain change width of the variable gain RF amplifier 20 shown in FIG. 11 becomes almost equal between the ranges higher and lower than the reference potential VREF. This simplifies the design of the subsequent circuit, and the variable gain RF amplifier 20 is more convenient.

An output current from the gm amplifier 21 functions to drive the feedback resistor 223 between the inverting input terminal (−) and output terminal of the operational amplifier circuit 222 in FIG. 12. The first embodiment prevents the gain of the gm amplifier 21 from decreasing excessively, and thus prevents the level for driving the feedback resistor 73 from running short.

Note that the gm amplifier 21 and current control circuit 30 are not limited to the arrangements described in the first embodiment, and can be variously modified.

In the current control circuit 30 of the first embodiment, the slope of the control characteristic is reduced in the range where the control voltage RFGC is lower than the reference potential VREF, without changing this slope in the range where the control voltage RFGC is higher than the reference potential VREF. Alternatively, the slope of the control characteristic may be increased in the range where the control voltage RFGC is higher than the reference potential VREF, without changing this slope in the range where the control voltage RFGC is lower than the reference potential VREF. Even this arrangement can attain the characteristic shown in FIG. 13A.

The present invention can also be applied to an optical disk playback apparatus capable of playing back a rewritable CD (CD-RW) as an optical disk in addition to a general CD. In this case, to cope with different characteristics between the general CD and CD-RW, a level correction switching circuit for switching correction performed for a signal level from the head amplifier circuit 12 in accordance with a general CD playback mode/CD-RW playback mode is inserted in the input side of the variable gain RF amplifier 20.

<Another Example of Optical Disk Playback Apparatus>

The present invention can also be applied to an "optical disk playback apparatus" disclosed in Jpn. Pat. Appln. No. 7-271191 (Jpn. Pat. Appln. KOKAI Publication No. 9-115142).

Figure 14:
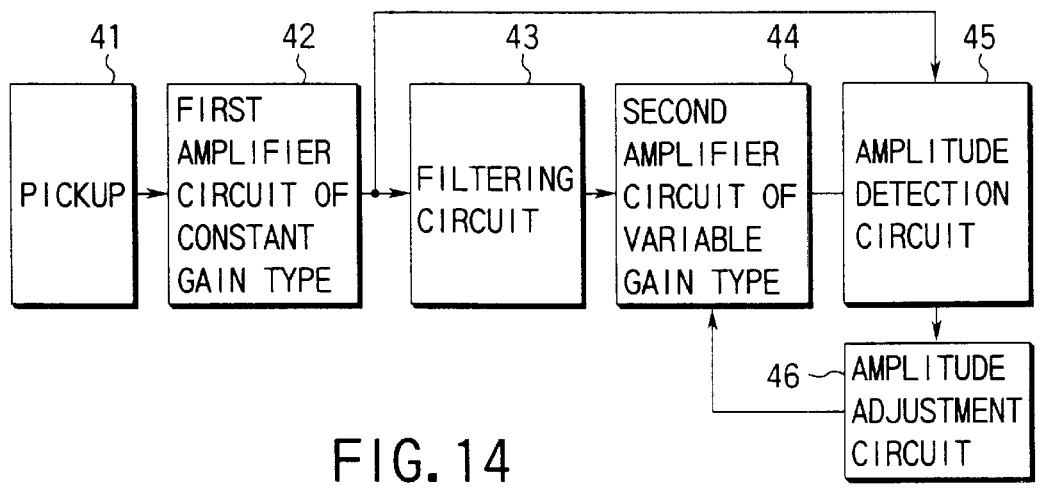
FIG. 14 is a block diagram showing another example of the optical display playback apparatus to which the present invention can be applied.

As shown in FIG. 14, this "optical disk playback apparatus" comprises an optical pickup 41 for reading information data recorded on disk and generating an electrical signal corresponding to the information data, a first amplifier circuit 42 of constant gain type for amplifying the output signal from the pickup 41 with a predetermined gain, a filtering circuit 43 for cutting off the DC component of an output signal from the first amplifier circuit 42, a second amplifier circuit 44 of variable gain type for amplifying an output signal from the filtering circuit 43 with a gain corresponding to a gain control signal, an amplitude detection circuit 45 for detecting the amplitude of the output signal from the first amplifier circuit 42, and an amplitude adjustment circuit 46 for comparing an output signal from the amplitude detection circuit 45 with a predetermined signal amplitude reference value set in advance, generating a gain control signal corresponding to the difference, and supplying the gain control signal to the second amplifier circuit 44.

In this example, the same processing as in the first embodiment can be done for the second amplifier circuit 44 of variable gain type which receives the gain control signal voltage from the amplitude adjustment control loop.

In the current control circuit of the first embodiment, the linear change slope of the output current is different between the range where the control voltage RFGC is lower than the reference potential VREF and the range where the control voltage RFGC is higher than the reference potential VREF. However, the current control circuit according to the present invention is not limited to this, and can be constituted to change the linear change slope in accordance with different functions in the two ranges.

<Second Embodiment of Current Control Circuit>

In the current control circuit of the first embodiment, the slope of the control characteristic changes at one reference potential VREF as an inflection point within the change range of the control voltage. Alternatively, the current control circuit of the present invention can be constituted such that the change characteristic of the output current follows different functions in respective sections using a plurality of different reference potentials as inflection points within the change range of the control voltage. An example of this current control circuit will be described with reference to FIG. 15.

Figure 15:
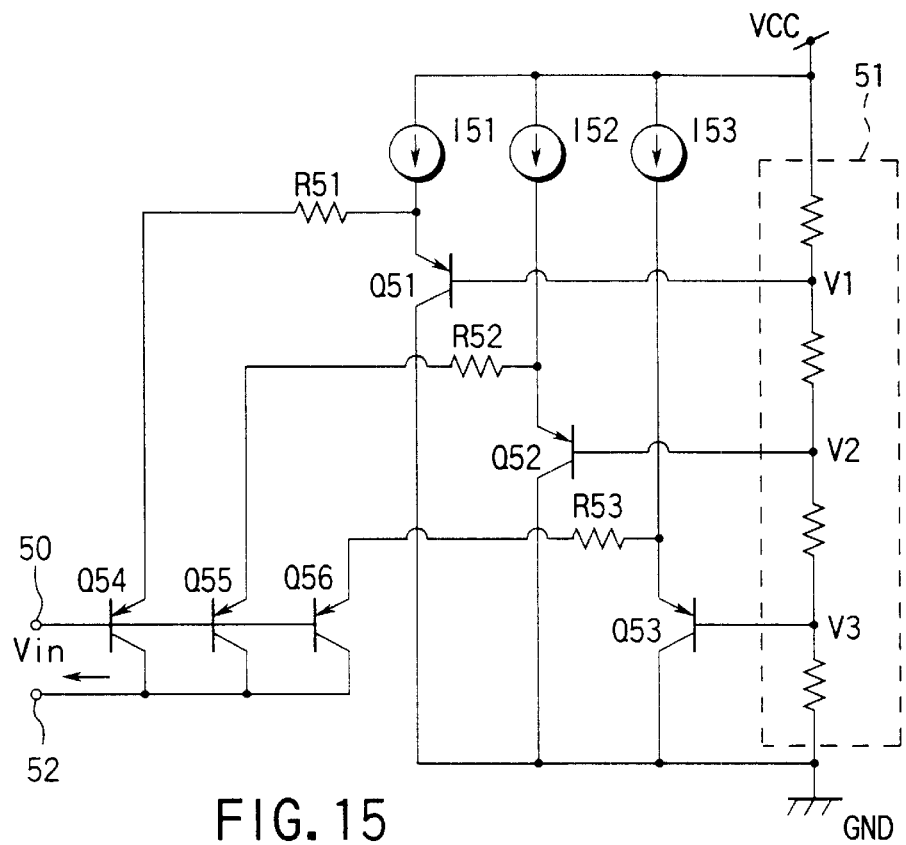
FIG. 15 is a circuit diagram showing a current control circuit according to the second embodiment of the present invention.

The current control circuit shown in FIG. 15 comprises a resistance division circuit 51 for generating three different reference potentials V1, V2, and V3, three PNP transistors Q51, Q52, and Q53 having bases for receiving the three reference potentials V1, V2, and V3, and collectors connected to GND, constant current sources I51, I52, and I53 respectively connected between a VCC node and the emitters of the three PNP transistors Q51, Q52, and Q53, and three output PNP transistors Q54, Q55, and Q56 having emitters connected to the emitters of the three PNP transistors Q51, Q52, and Q53 via resistors R51, R52, and R53, collectors commonly connected to the current output node 52, and bases commonly connected to a signal input node 50.

In this arrangement, the transistors Q51 and Q54, transistors Q52 and Q55, and transistors Q53 and Q56 form differential pairs, respectively. Depending on the high/low level of the base voltage, one of each differential pair of transistors is turned on, and the other is turned off.

(a) If a control voltage input Vin to the signal input node 50 is lower than the reference potential V3, the three output transistors Q54, Q55, and Q56 are turned on. Their currents are added and output from a current output node 52.

(b) If the control voltage input Vin is higher than the reference potential V3 and lower than the reference potential V2, one output transistor Q56 is turned off, and the two output transistors Q54 and Q55 are turned on. Their currents are added and output from the current output node 52.

(c) If the control voltage input Vin is higher than the reference potential V2 and lower than the reference potential V1, the two output transistors Q55 and Q56 are turned off, and one output transistor Q54 is turned on. Their currents are output from the current output node 52.

Figure 16A:
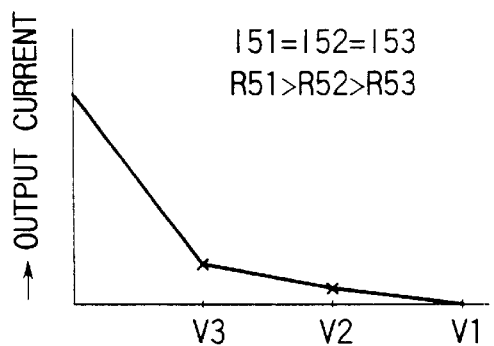
FIGS. 16A and 16B are graphs, respectively, showing different change characteristics of an output current from a current output node with respect to changes in control voltage input to a signal input node in the current control circuit of FIG. 15.

FIG. 16A shows the change characteristic of an output current Iout from the current output node 52 with respect to changes in control voltage input Vin to the signal input node 50 when the currents of the constant current sources I51, I52, and I53 are almost equal to each other, and the values of the resistors R51, R52, and R53 are set to R51>R52>R53 in the current control circuit of FIG. 15.

Figure 16B:
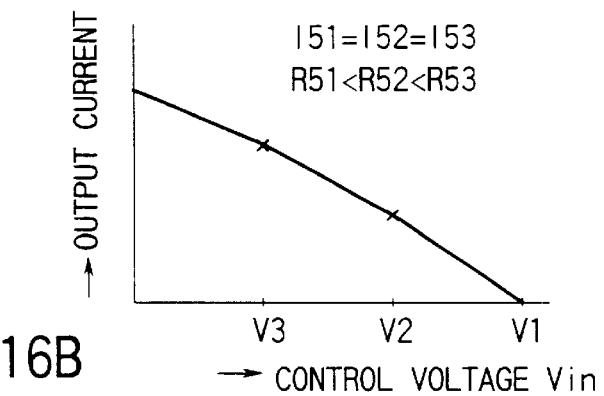

FIG. 16B shows the change characteristic of the output current Iout from the current output node 52 with respect to changes in control voltage input Vin to the signal input node 50 when the currents of the constant current sources I51, I52, and I53 are almost equal to each other, and the values of the resistors R51, R52, and R53 are set to R51<R52<R53 in the current control circuit of FIG. 15.

[RF Equalizing Filter According to Application of the Invention]

Note that the current control circuit of the present invention is not limited to an application to the variable gain RF amplifier of the optical disk playback apparatus, and can also be applied to, e.g., the RF equalizing filter of a CD-R playback apparatus.

With the spread of recent CD-R apparatuses, blank disks are being supplied, and poor-quality disks may be formed depending on a combination of a CD-R writer and blank disk. As the speed of a CD-ROM drive increases, the error rate of a disk, which is low in low-speed playback operation, often increases to a serious degree in high-speed playback operation.

One of the causes is jitters. The jitters of a display playback signal (RF signal) must be reduced in higher-speed playback operation, but in practice cannot be suppressed because of various factors. To prevent this, a recent playback apparatus uses an RF equalization filter to boost the third T frequency included in an RF signal and reduce the jitters of the RF signal.

Figure 17:
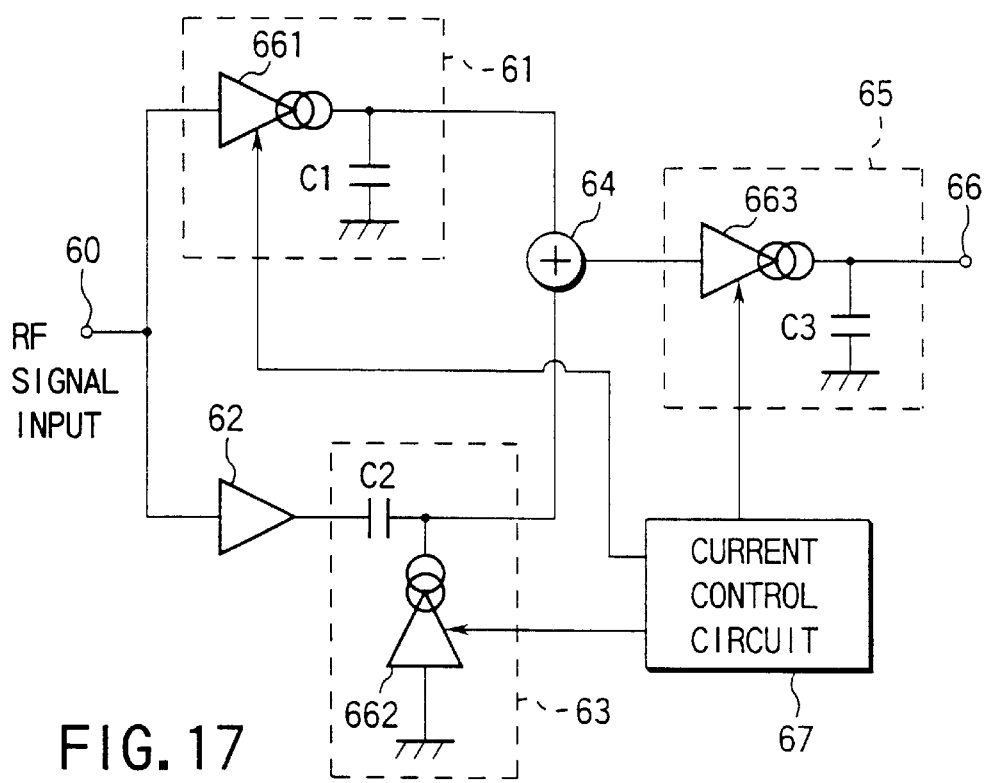
FIG. 17 is a circuit diagram showing an RF equalizing filter according an application of the present invention.

FIG. 17 shows an arrangement of an RF equalizing filter which adopts the current control circuit of the present invention.

An RF signal input to a signal input node 60 is input to a first LPF (Low-Pass Filter) 61 and to an HPF (High-Pass Filter) 63 via a gain adjustment circuit 62. Output signals from the first LPF 61 and HPF 63 are added (synthesized) by an adder circuit 64. An output signal from the adder circuit 64 is output from a signal output node 66 via a second LPF 65.

The first LPF 61 is made up of a first variable gain RF amplifier circuit and a bypass capacitor C1 connected between GND and the output node of the RF amplifier circuit.

The HPF 63 is made up of a coupling capacitor C2 inserted in a signal path on the output side of the gain adjustment circuit 62, and a second variable gain RF amplifier circuit having an input node connected to GND and an output node connected to the signal path on the output side of the coupling capacitor C2.

The second LPF 65 is made up of a third variable gain RF amplifier circuit and a bypass capacitor C3 connected between GND and the output node of the RF amplifier circuit.

Each variable gain RF amplifier circuit is made up of a gm amplifier and current control circuit like the ones described in the first embodiment. In the second embodiment, gm amplifiers 661 to 663 of the respective variable gain RF amplifier circuits are commonly controlled by a current output from one current control circuit 67.

Figure 18A:
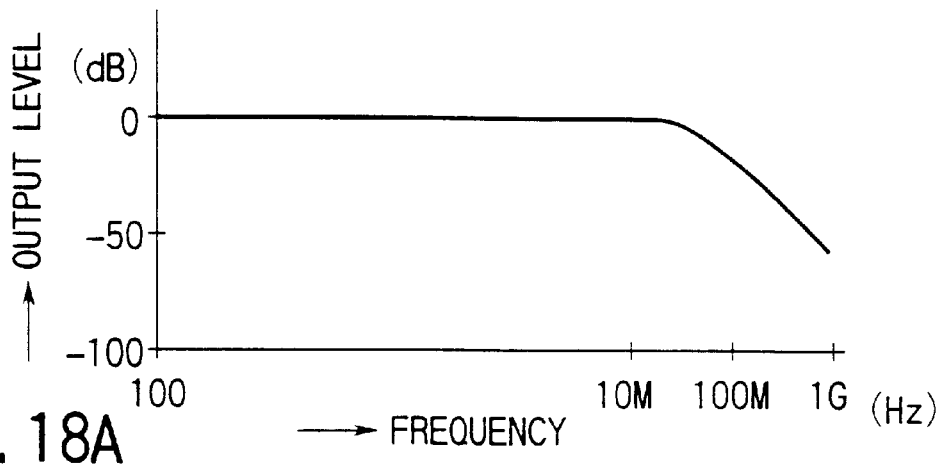
FIGS. 18A to 18C are graphs, respectively, showing frequency characteristics of the first LPF, HPF, and second LPF in FIG. 17.
Figure 18B:
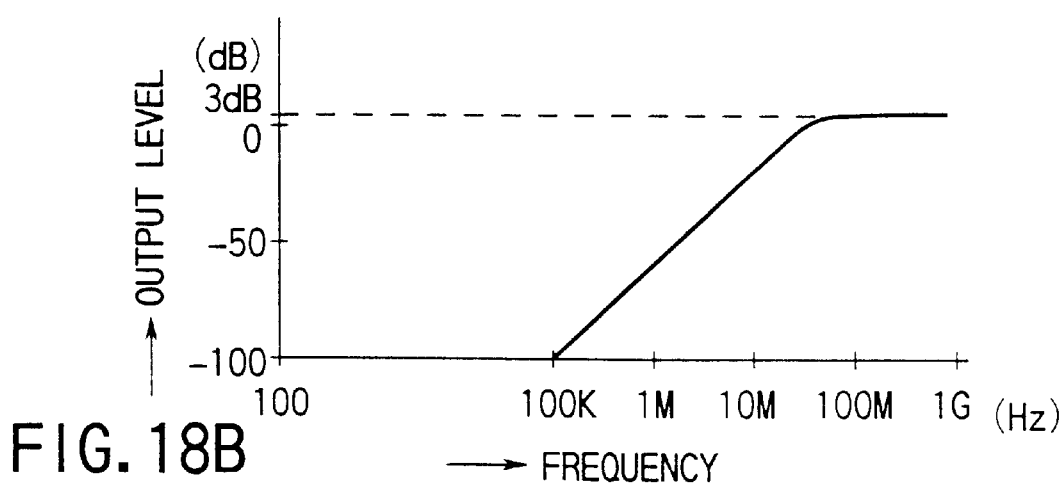
Figure 18C:
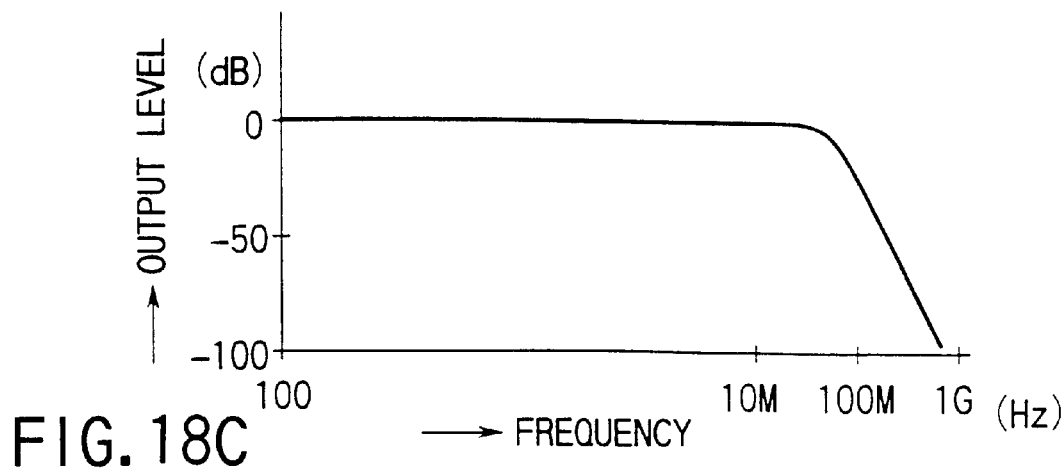

FIGS. 18A, 18B, and 18C show frequency characteristics of the first LPF, HPF, and second LPF in FIG. 17, respectively.

Figure 19:
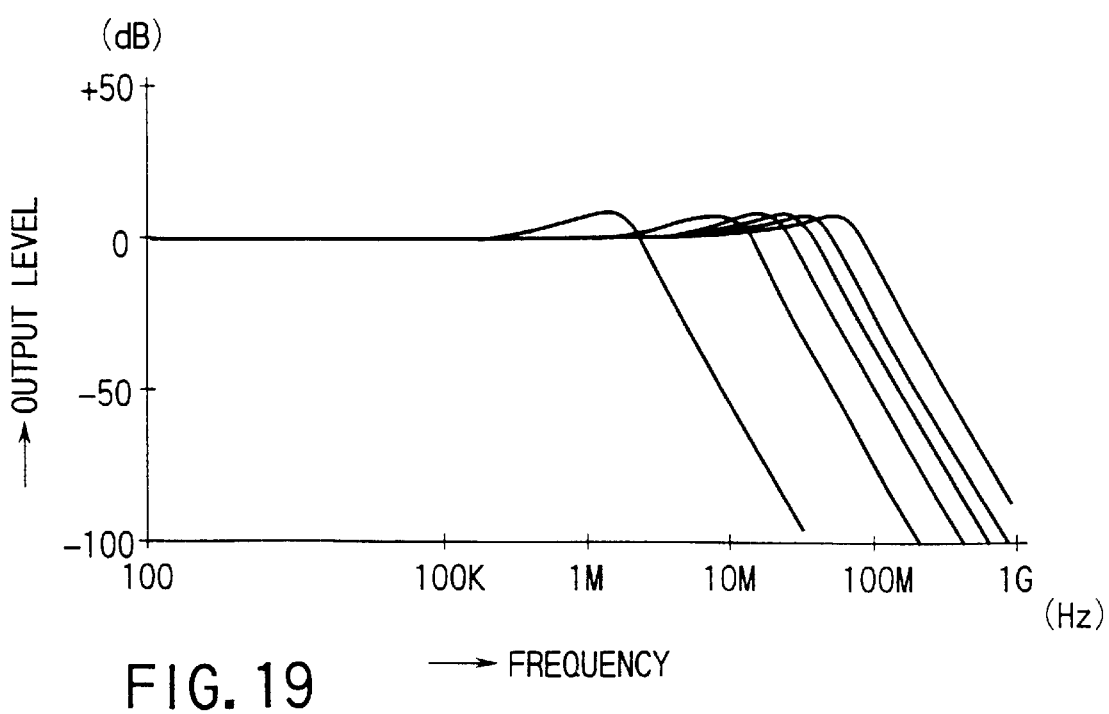
FIG. 19 is a graph showing a frequency characteristic of the RF equalizing filter in FIG. 17 and changes in cutoff frequency along with increase/decrease in gm of gm amplifiers in the variable gain RF amplifiers of the first LPF, HPF, and second LPF.

FIG. 19 shows a frequency characteristic of the RF equalizing filter in FIG. 17 and changes in cutoff frequency along with increase/decrease in gm of the gm amplifiers 661, 662, and 663 of the variable gain RF amplifier circuit of the filters 61, 63, and 65.

That is, the frequency characteristics of the filters 61, 63, and 65 are controlled by controlling the gains of the gm amplifiers 661, 663, and 663 in the variable gain RF amplifier circuits of the filters 61, 63, and 65. Accordingly, the frequency characteristic of the whole RF equalizing filter can be controlled. In this case, the characteristic near the end (shoulder) of the flat part of the frequency characteristic of the whole RF equalizing filter can be controlled by adjusting the gain of the gain adjustment circuit 62 series-inserted in the HPF 63.

As has been described above, the present invention can provide a current control circuit capable of arbitrarily setting the output current so as to make the sensitivity different between the range where the control voltage input is lower than the reference potential and the range where the control voltage input is higher than the reference potential.

In addition, the present invention can provide a convenient variable gain amplifier circuit in which the gain control sensitivity of a gm amplifier can be set almost equal between the range where the control voltage input to the current control circuit is lower than the reference potential and the range where the control voltage input is higher than the reference potential, thereby simplifying the design of the subsequent circuit, and an optical disk playback apparatus using the same.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical disk playback apparatus comprising:
    an optical pickup for reading information data recorded on an optical disk and generating an RF signal corresponding to the information data;
    a head amplifier for amplifying an output signal from the pickup; and
    a variable gain amplifier receiving an output signal from the head amplifier, and outputting an output signal with a predetermined amplitude by adjusting the output signal from the head amplifier in amplitude,
    wherein the variable gain amplifier includes a current control circuit comprising:
        a first circuit receiving a control voltage and a reference potential, and outputting a current in accordance with the control voltage and the reference potential,
        a second circuit receiving the control voltage and the reference potential, and outputting a current in accordance with the control voltage and the reference potential, and
        a third circuit outputting a current output generated by adding an output of the first circuit and an output of the second circuit,
    wherein the current output changes in accordance with different functions in a range where the control voltage input is lower than the reference potential and a range where the control voltage is not lower that the reference potential;
    said variable gain amplifier having a gm amplifier a transconductance of which is changed by controlling a collector current of an amplifier transistor in accordance with the current output from the current control circuit, and a gain control sensitivity of the gm amplifier is substantially equal both in a range where the control voltage applied to the current control circuit is lower than the reference potential and a range where the control voltage applied to the current control circuit is not lower than the reference potential;
    said variable gain amplifier comprising,
        a gm amplifier a transconductance of which is changed by controlling a collector current of an amplifier transistor in accordance with the current output from the current control circuit, and a gain control sensitivity of the gm amplifier is substantially equal both in a range where the control voltage applied to the current control circuit is lower than the reference potential and a range where the control voltage applied to the current control circuit is not lower than the reference potential,
        a bipolar type operational amplifier circuit having an inverting input terminal for receiving an output signal from the gm amplifier, and having a non-inverting input terminal connected to the reference potential, and
        a feedback resistor connected between the inverting input terminal and an output terminal of the operational amplifier circuit.

2. An equalizing filter for an optical disk playback apparatus, inserted in a signal path of an RF signal generated by n optical pickup for reading information data recorded on an optical disk, the equalizing filter comprising:
    a first low-pass filter receiving the RF signal on the signal path;
    a high-pass filter receiving the RF signal on the signal path;
    an adder circuit receiving output signals from the first low-pass filter and the high-pass filter; and
    a second low-pass filter receiving an output signal from the adder circuit,
    wherein:
        the first low-pass filter, the high pass filter, and the second low-pass filter each include a variable gain amplifier circuit, the variable gain amplifier circuit having:
            a current control circuit comprising:
                a first circuit receiving a control voltage and a reference potential, and outputting a current in accordance with the control voltage and the reference potential, a second circuit receiving the control voltage and the reference potential, and outputting a current in accordance with the control voltage and the reference potential, and a third circuit outputting a current output generated by adding an output of the first circuit and an output of the second circuit, wherein the current output changes in accordance with different functions in a range where the control voltage input is lower than the reference potential and a range where the control voltage is not lower that the reference potential; and a gm amplifier including an amplifier transistor, the transconductance of the gm amplifier varying by controlling a collector current of the amplifier transistor in accordance with the current output from the current control circuit.

3. An equalizing filter according to claim 2, wherein:

the current control circuit is arranged in common for the gm amplifiers of the respective variable gain amplifier circuits in the first low-pass filter, the high pass filter, and the second low-pass filter.

* * * * *